US 6,729,726 B2
May 4, 2004

(12) United States Patent
Miller et al.

(54) EYEWEAR FOR HANDS-FREE COMMUNICATION

(75) Inventors: Eric C. Miller, Los Gatos, CA (US); Charles N. Wang, Campbell, CA (US); Erhan H. Gunday, Santa Barbara, CA (US); Albert M. Juergens, New Fairfield, CT (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 09/972,478

(22) Filed: Oct. 6, 2001

(65) Prior Publication Data
US 2003/0067585 A1 Apr. 10, 2003

(51) Int. Cl.7 .................................................. G02C 1/00
(52) U.S. Cl. ......................... 351/158; 351/123; 381/381
(58) Field of Search ................................ 351/111, 123, 351/158; 381/327, 381, 237

(56) References Cited

U.S. PATENT DOCUMENTS

| 2,207,705 | A | * | 7/1940 | Cox | 351/158 |
| 3,620,608 | A | | 11/1971 | Davis | 351/111 |
| D253,415 | S | | 11/1979 | Solomon | D16/81 |
| D272,450 | S | | 1/1984 | Strieber | D16/102 |
| 4,683,587 | A | | 7/1987 | Silverman | 381/25 |
| 4,856,086 | A | | 8/1989 | McCullough | 455/344 |
| 4,882,769 | A | * | 11/1989 | Gallimore | 455/344 |
| 4,902,120 | A | * | 2/1990 | Weyer | 351/158 |
| 4,904,078 | A | * | 2/1990 | Gorike | 351/158 |
| 5,034,995 | A | | 7/1991 | Ciccone | 455/344 |
| 5,100,328 | A | | 3/1992 | Badgley | 434/308 |
| 5,159,639 | A | | 10/1992 | Shannon et al. | 381/68.5 |
| 5,164,987 | A | | 11/1992 | Raven | 381/25 |
| 5,276,471 | A | | 1/1994 | Yamauchi et al. | 351/153 |
| 5,327,178 | A | | 7/1994 | McManigal | 351/158 |
| 5,367,345 | A | | 11/1994 | da Silva | 351/123 |
| 5,404,385 | A | | 4/1995 | Ben-Haim | 377/24.2 |
| 5,563,951 | A | | 10/1996 | Wang et al. | 381/24 |
| 5,606,743 | A | | 2/1997 | Vogt et al. | 455/347 |
| 5,608,808 | A | | 3/1997 | da Silva | 381/183 |
| 5,715,323 | A | | 2/1998 | Walker | 381/187 |
| 5,757,339 | A | | 5/1998 | Williams et al. | 345/8 |
| 5,781,272 | A | | 7/1998 | Bright et al. | 351/123 |
| 5,790,229 | A | | 8/1998 | Poloni et al. | 351/123 |
| 5,988,812 | A | * | 11/1999 | Wingate | 351/158 |
| 6,010,216 | A | | 1/2000 | Jesick | 351/158 |

(List continued on next page.)

FOREIGN PATENT DOCUMENTS

FR 2 559 279 * 8/1995 ................. 351/158
GB 2272073 A 5/1994

OTHER PUBLICATIONS

Bungert, Christoph, "HMD/headset/VR–helmet Comparison Chart" http://www.stereo3d.com/hmd.htm (Oct. 6, 2001).
900 MHz Handsfree Telephone System, http://www.radioshack.com/product.asp?catalog%5Fname=CTLG&cat (Aug. 15, 2001).
Donald J. Rotier, "Optical Approaches to the Helmet Mounted Display", SPIE vol. 1116, Helmet–Mounted Displays, 1989, pp. 14–18.

Primary Examiner—Huy Mai
(74) Attorney, Agent, or Firm—Winston & Strawn LLP

(57) ABSTRACT

Eyewear for two-way communication comprises a speaker and a microphone. The speaker is supported by an earstem of the eyewear. In some embodiments the earstem is formed into a speaker support loop. The speaker is supported by the loop and held away from the wearer's external outer ear. Speaker position is adjustable in relation to the wearer's ear. An electrical cord couples the microphone and speakers to a wearer unit that includes a wireless transceiver. The electrical cord functions as a neck strap to support the eyewear when removed from the head.

39 Claims, 15 Drawing Sheets

U.S. PATENT DOCUMENTS

| | | | |
|---|---|---|---|
| D426,846 S | 6/2000 | Jung | D16/313 |
| 6,091,546 A | 7/2000 | Spitzer | 359/618 |
| D435,058 S | 12/2000 | Green et al. | D16/309 |
| 6,176,576 B1 | 1/2001 | Green et al. | 351/123 |
| 6,233,345 B1 * | 5/2001 | Urwyler | 381/381 |
| D447,764 S | 9/2001 | Chen | D16/330 |
| 6,349,001 B1 | 2/2002 | Spitzer | 359/618 |
| D462,708 S * | 9/2002 | Miller et al. | D16/309 |
| D462,981 S * | 9/2002 | Miller | D16/335 |
| 2003/0068057 A1 * | 4/2003 | Miller et al. | 381/334 |

* cited by examiner

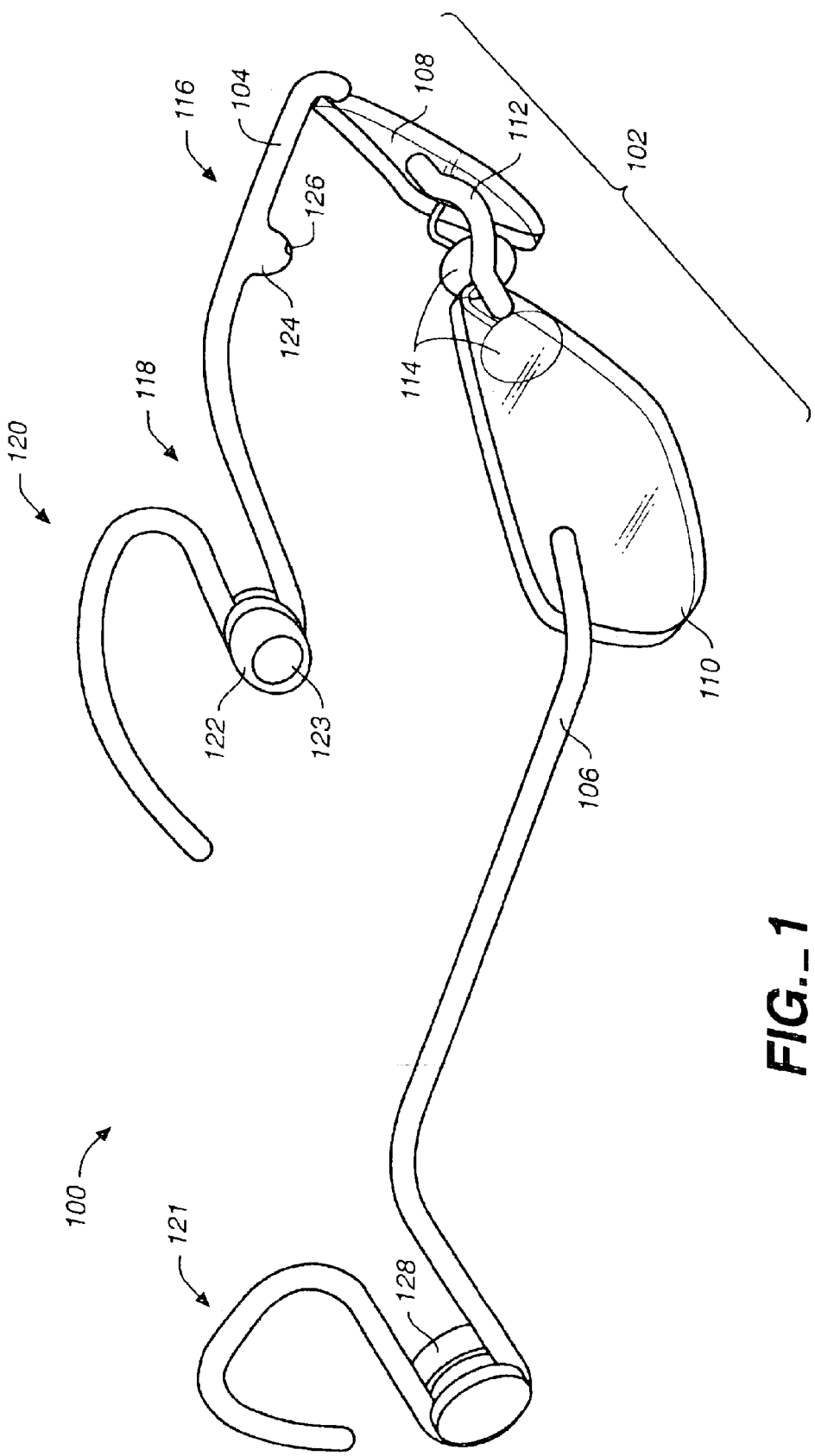
FIG._1

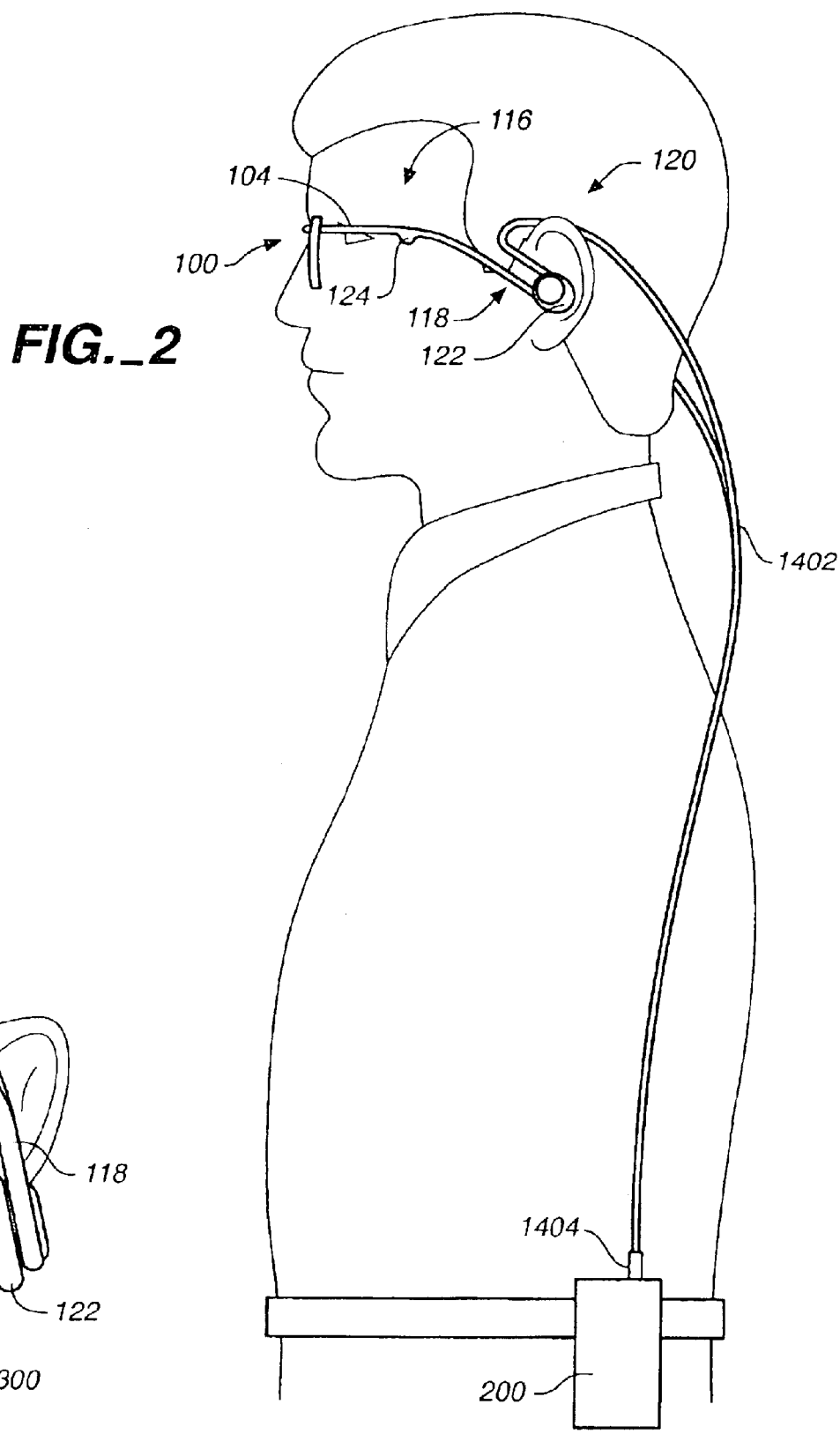

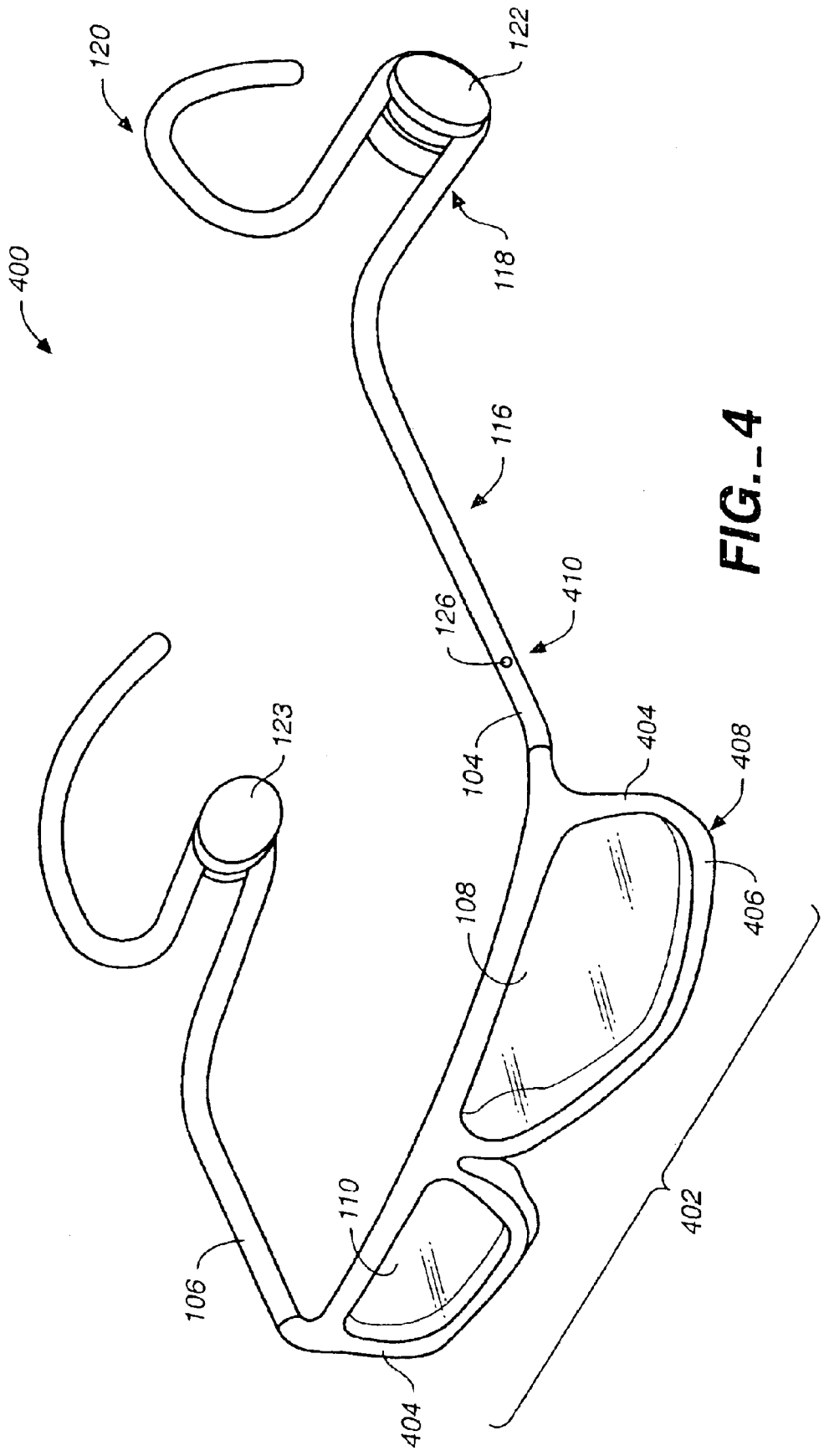
FIG._4

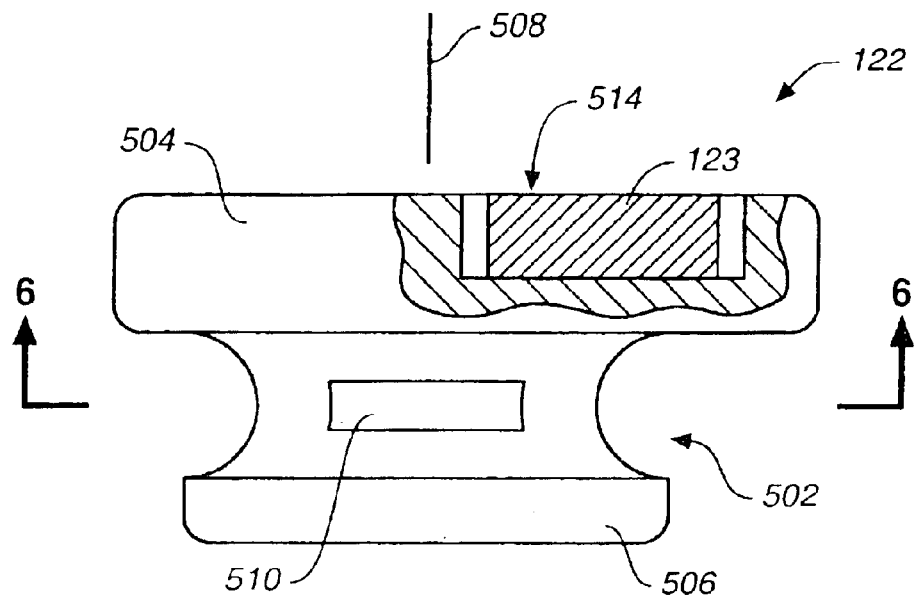
FIG._5
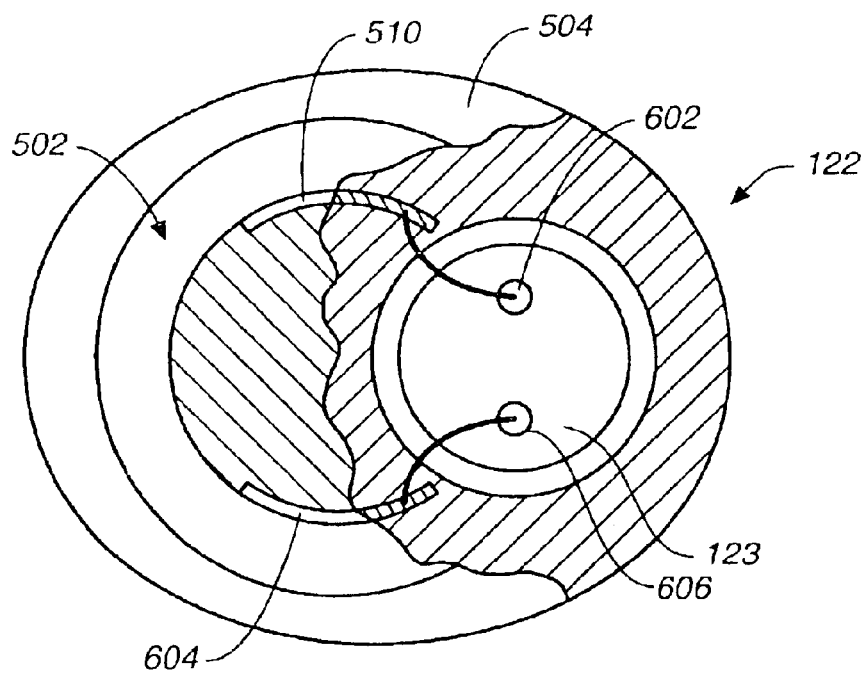
FIG._6

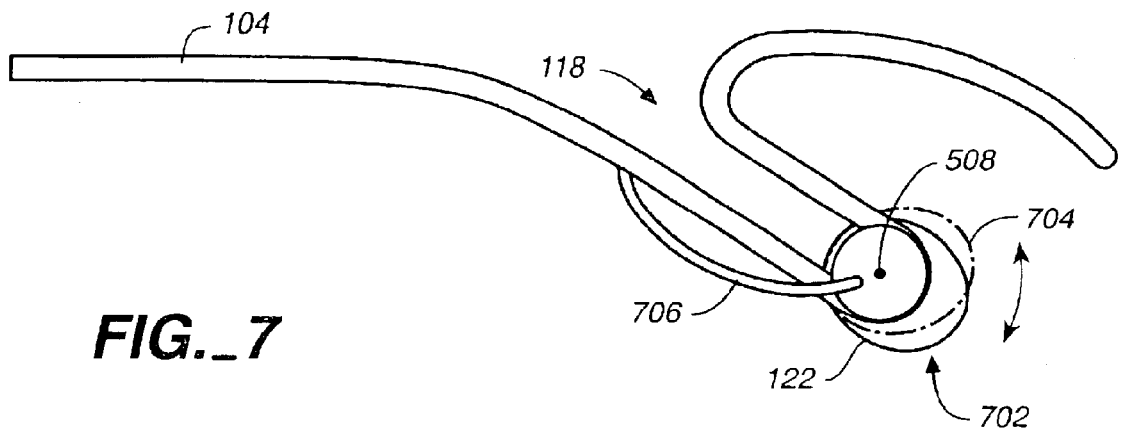
FIG._7
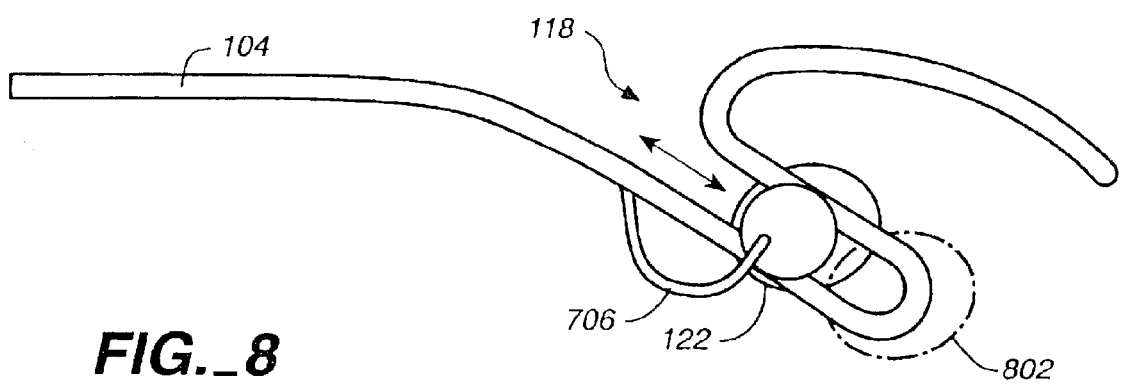
FIG._8

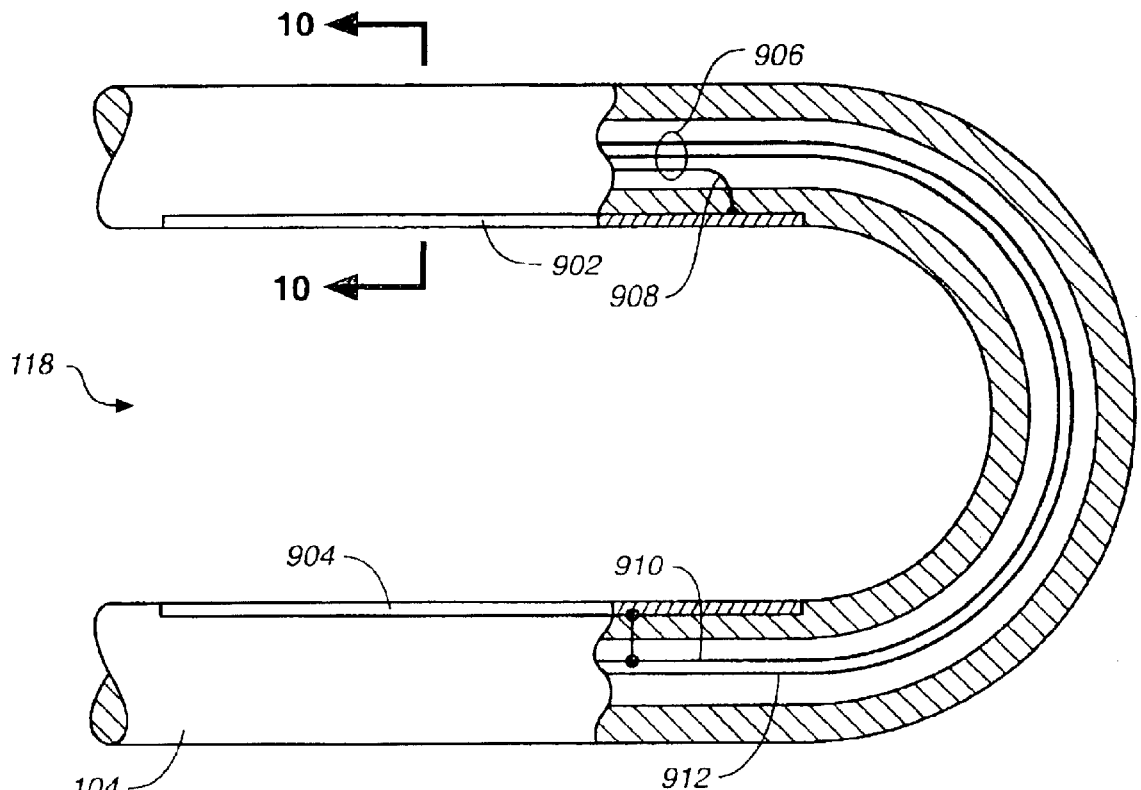
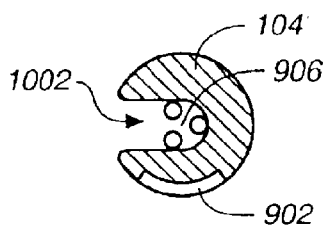 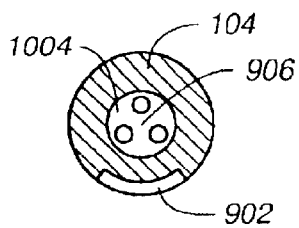 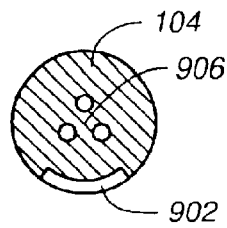
FIG._10A    FIG._10B    FIG._10C
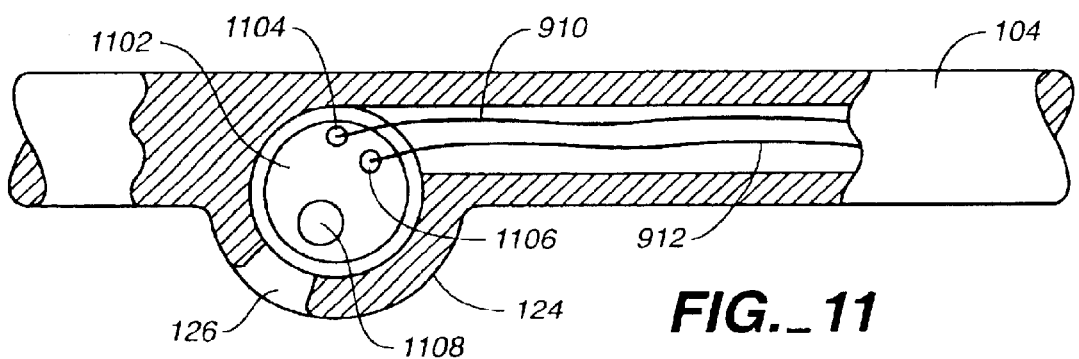
FIG._11

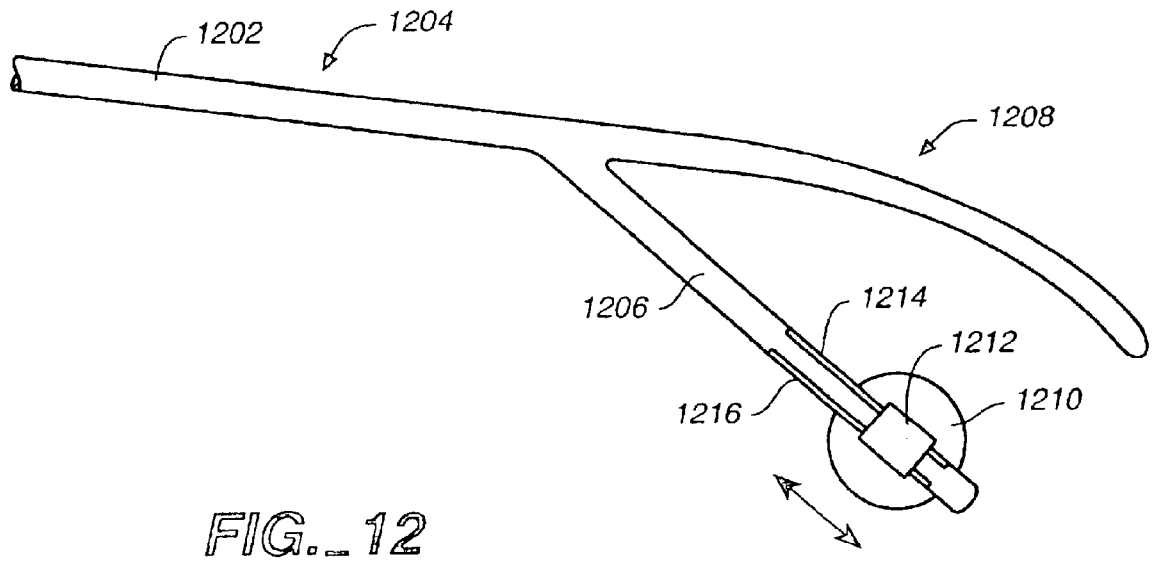
FIG._12
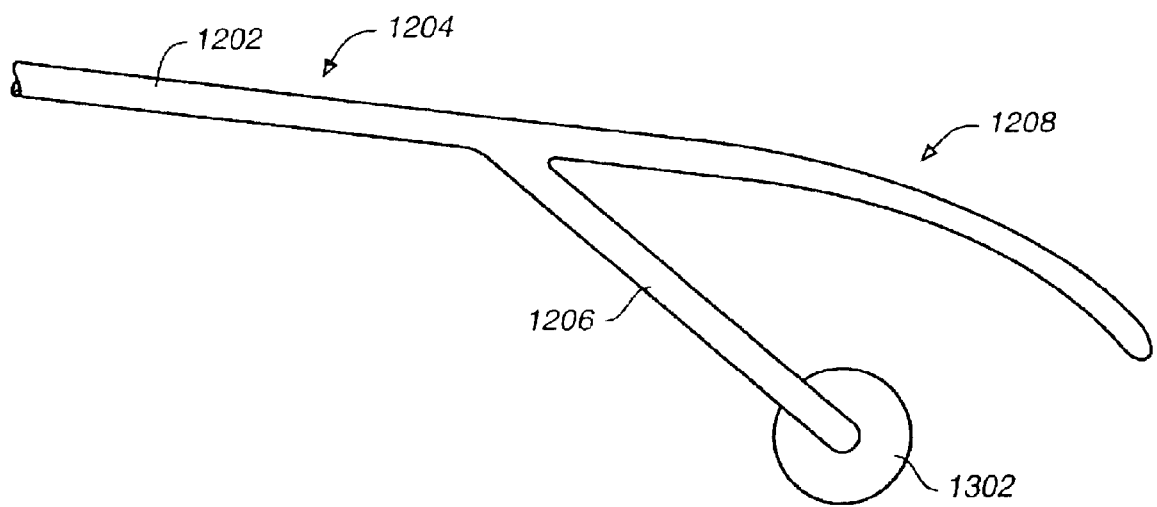
FIG._13

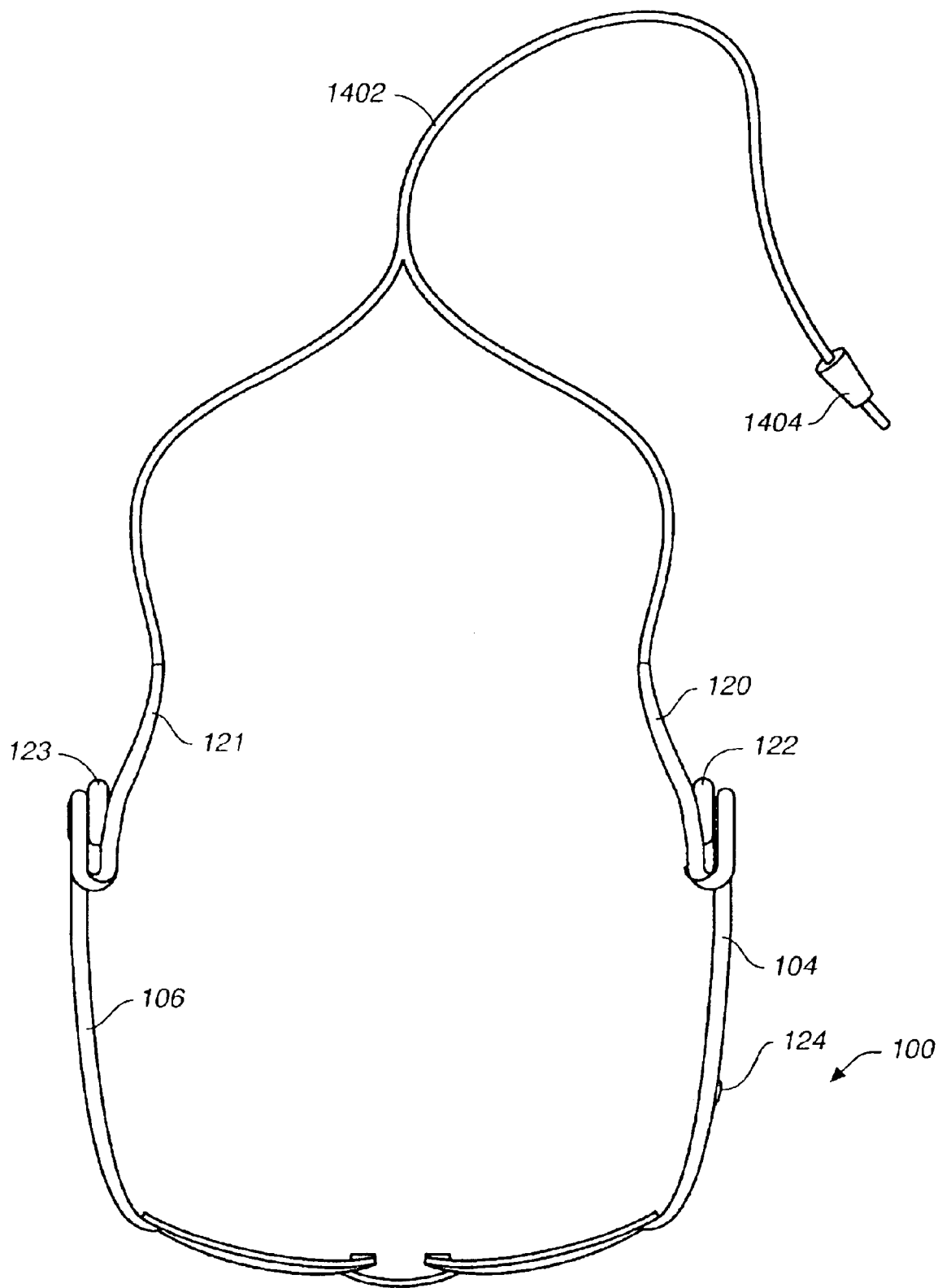
FIG._14

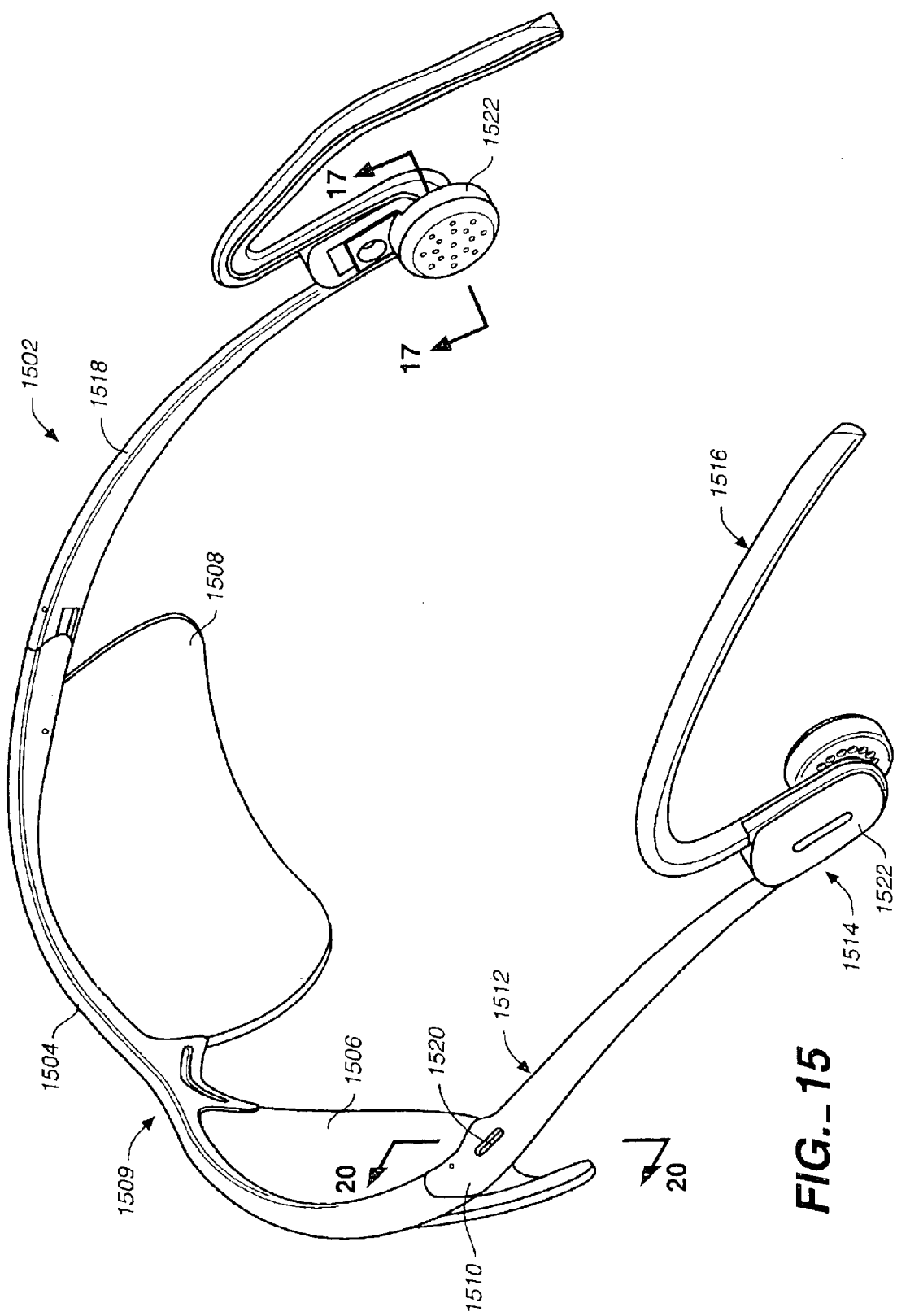
FIG._15

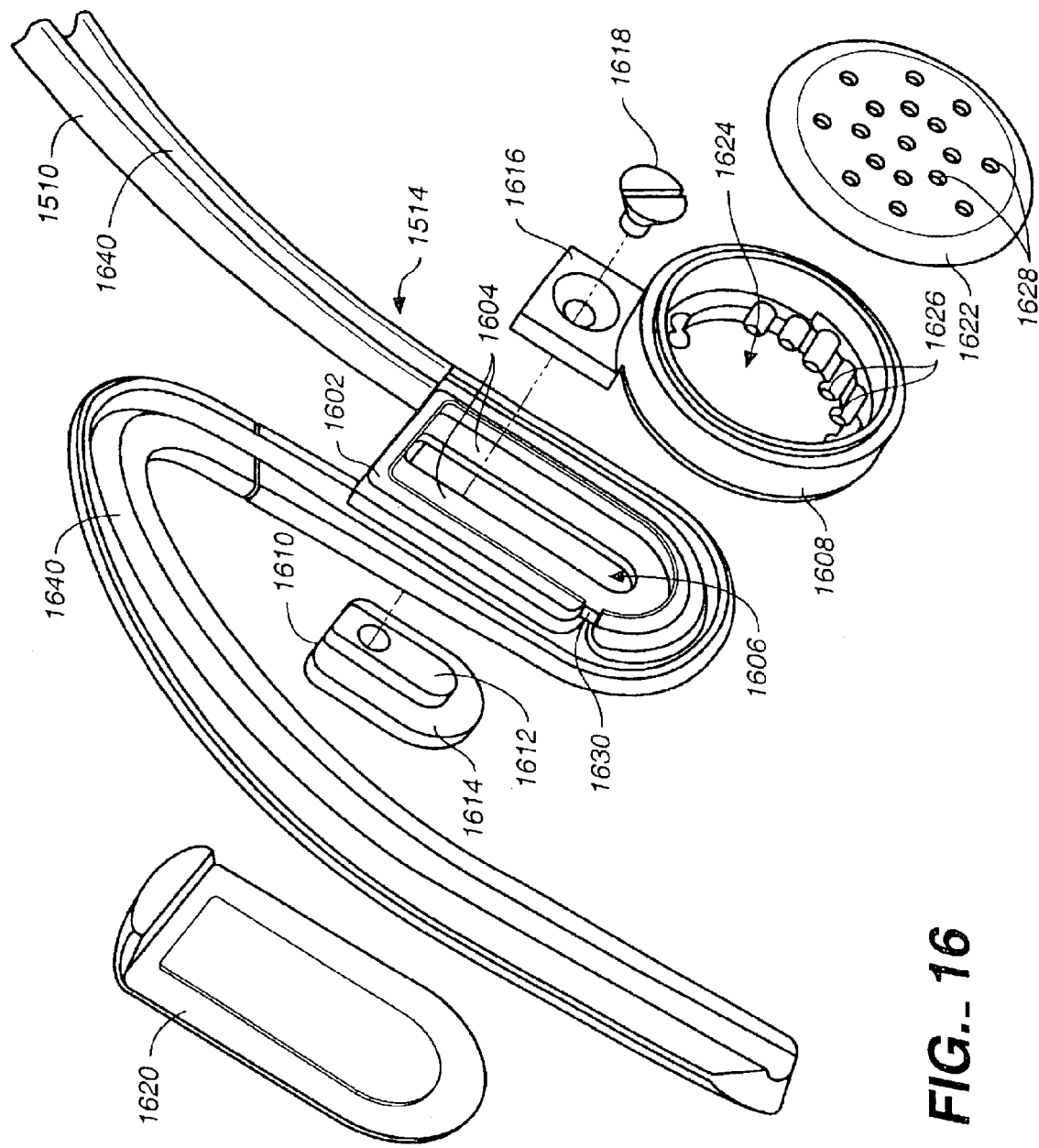
FIG._16

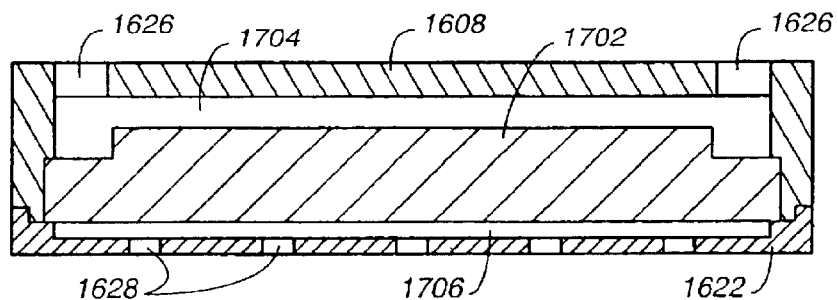
FIG._17
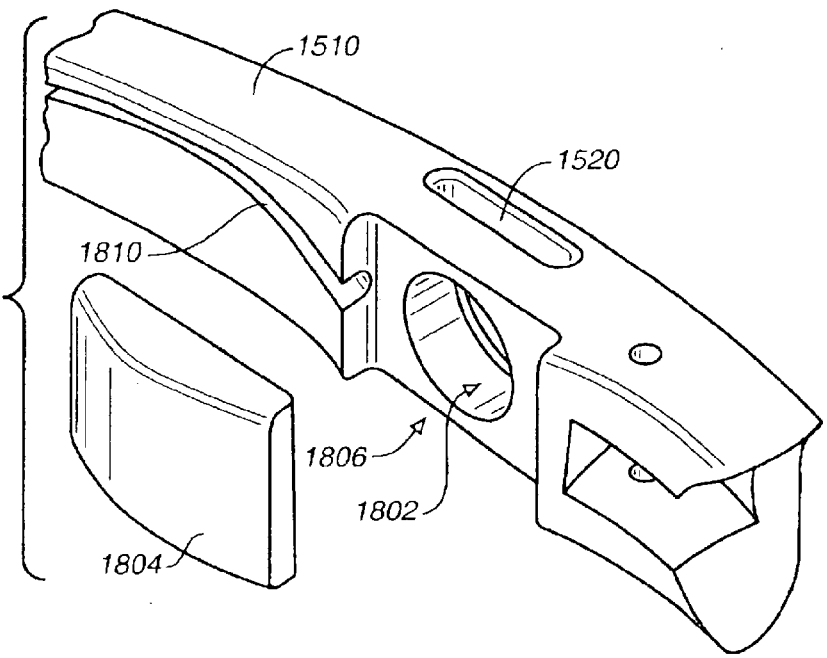
FIG._18A
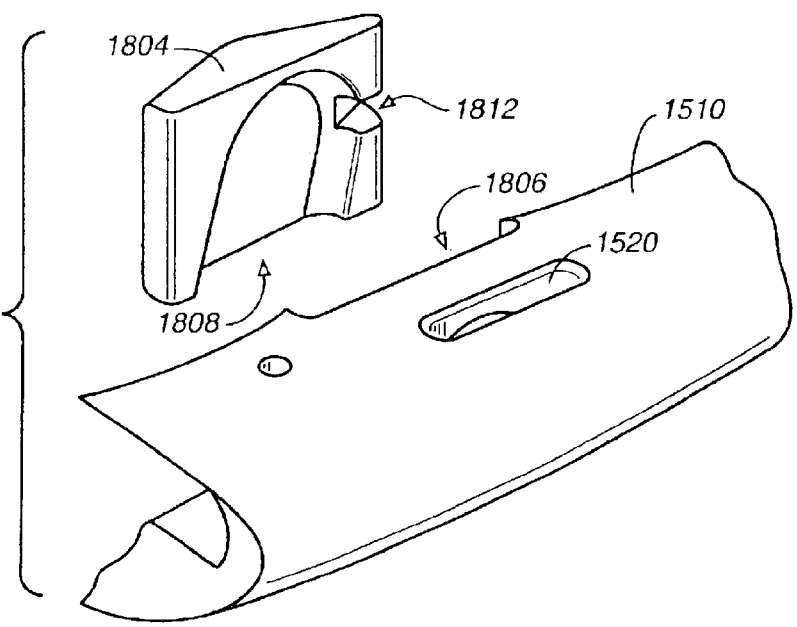
FIG._18B

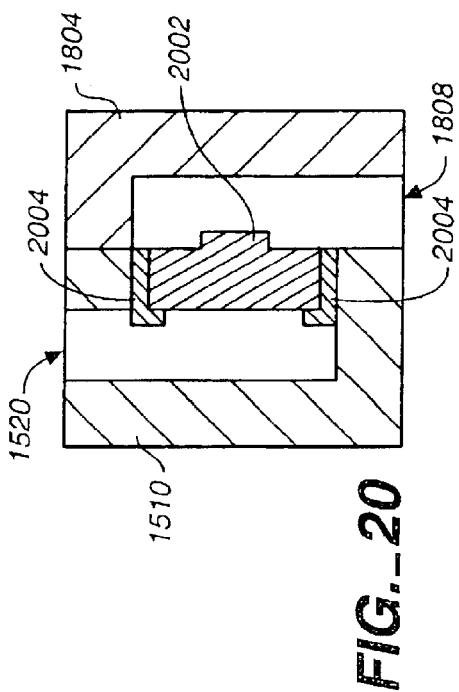
FIG._20
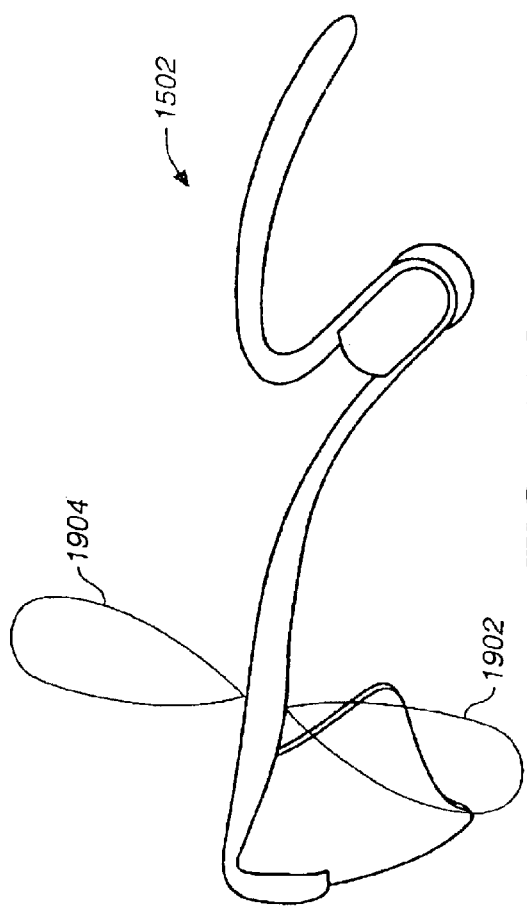
FIG._19A
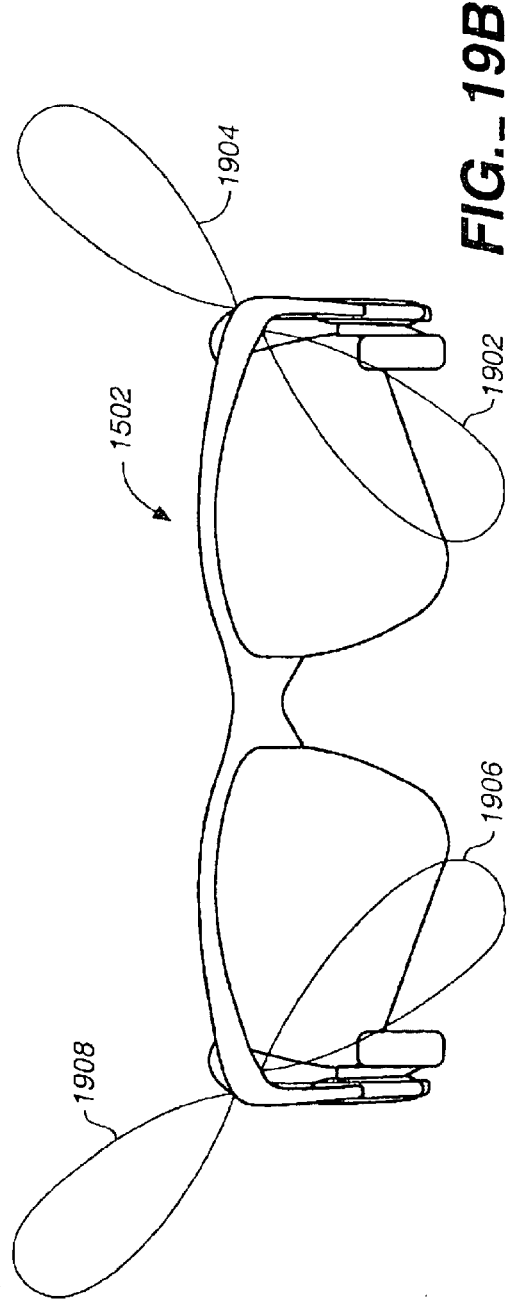
FIG._19B

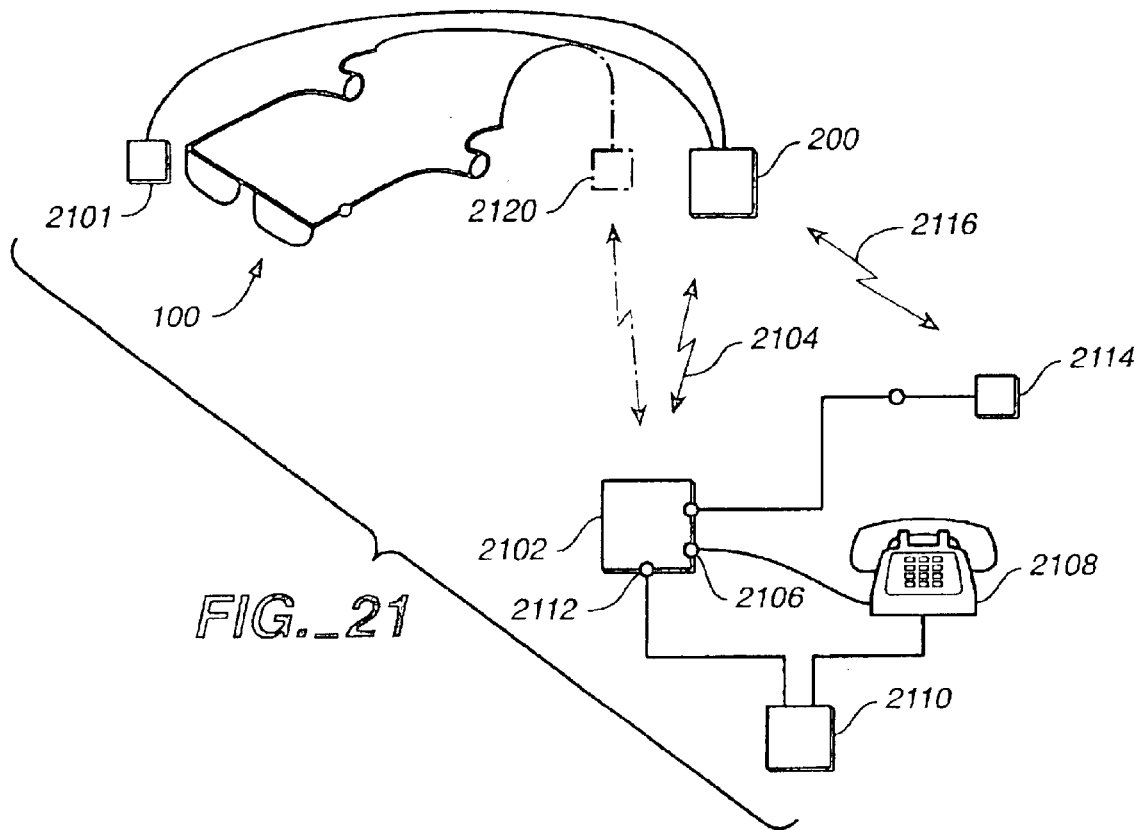
FIG._21
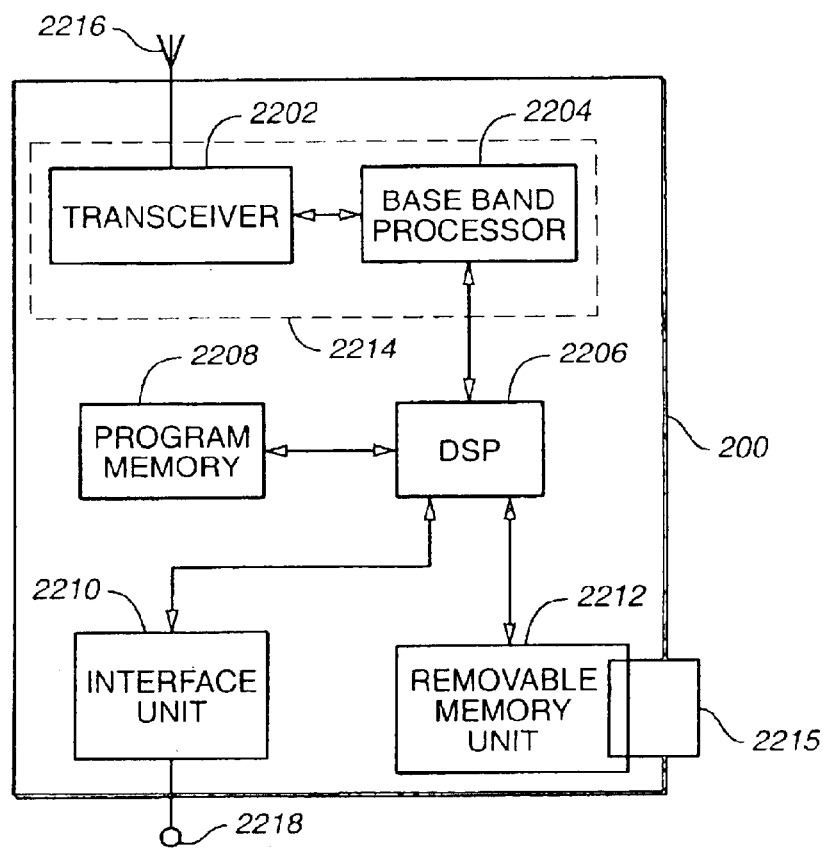
FIG._22

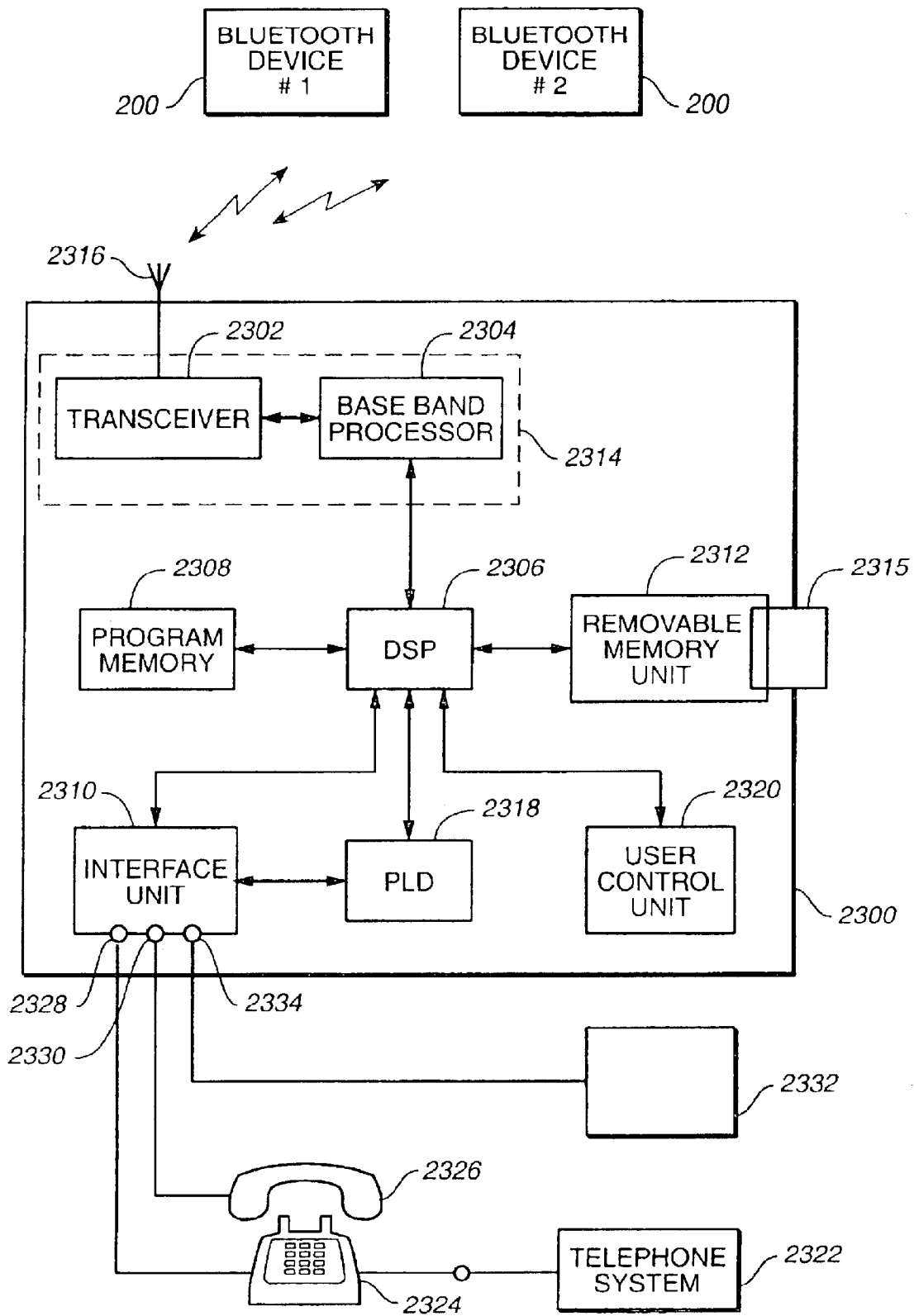
FIG._23

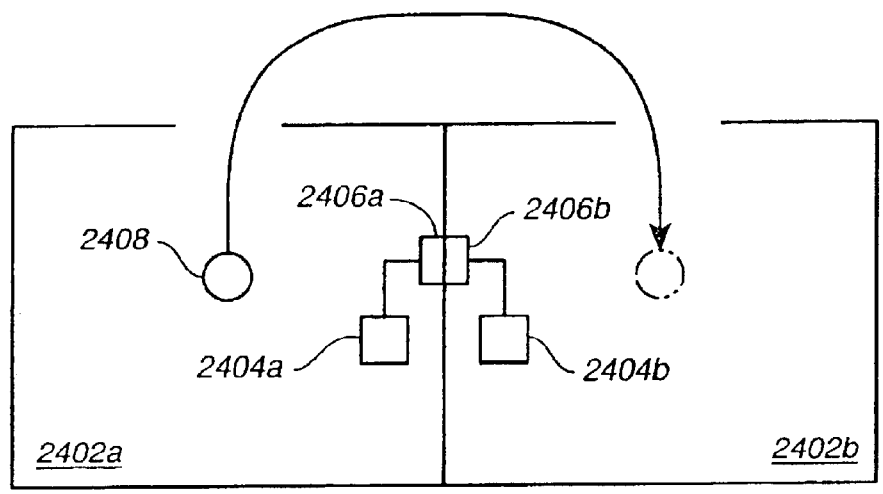
FIG._24
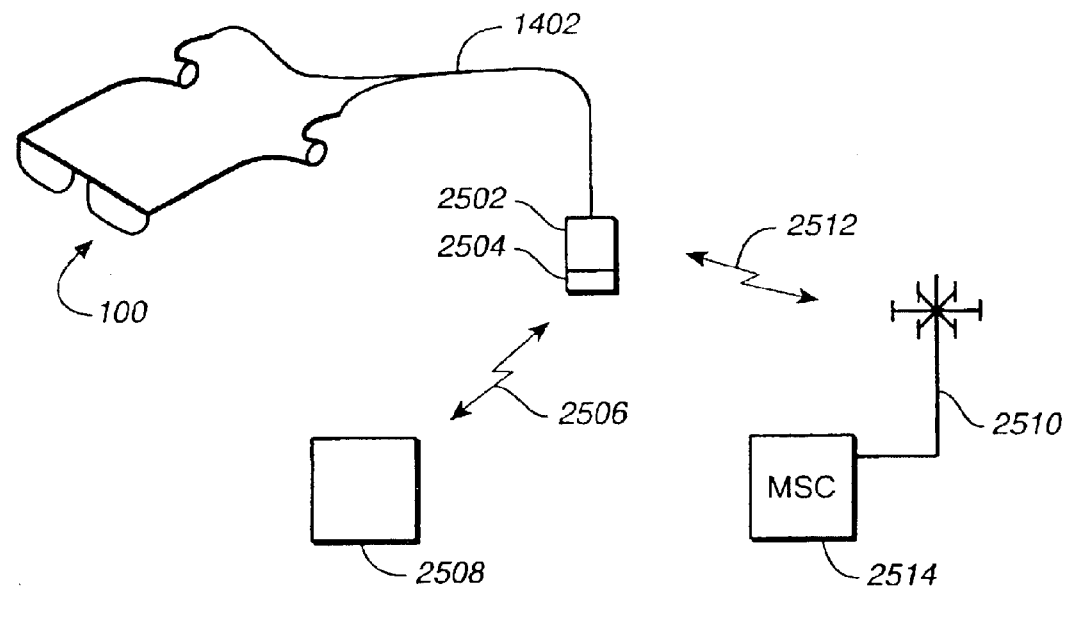
FIG._25

EYEWEAR FOR HANDS-FREE COMMUNICATION

RELATED APPLICATIONS

This application is related to U.S. patent application Ser. No. 09/972,479 entitled "Lens for Vision Enhancement" by Charles N. Wang et al., filed concurrently, and to U.S. patent application Ser. No. 09/972,342 entitled "Information System Using Eyewear for Communication" by Eric C. Miller et al., filed concurrently, both of which are incorporated herein by reference.

BACKGROUND

1. Field of Invention

Embodiments relate to headgear configured for hands-free two-way communication, and in particular to protective eyewear for medical personnel that provides hands-free two-way communication.

2. Related Art

Surgeons are typically required to send and receive information outside the surgical theater during surgery. In order to preserve the sterile field in which the surgeon places his or her hands, another surgical team member either relays information between the surgeon and a third party, or holds a telephone handset near the surgeon's mouth and ear. Both procedures are awkward and distracting, both to the communicating surgeon and to other persons (e.g., other surgeons) in the theater. Holding a handset in a position to allow the surgeon to converse is further complicated by surgical eye protection, surgical headgear, or other optical instruments the surgeon uses during surgery.

Surgeons also require information about supporting medical equipment operation. A surgeon who wants to know the pressure being output by a pump, for example, must ask someone to read and announce the pressure. Again, this procedure is awkward, distracting, and inefficient because the information must be relayed through another person and is audible to other in the room. Likewise, distractions and inefficiencies occur because surgeons operating equipment such as cameras must ask another person to make camera and video monitor adjustments.

Surgeons narrate their actions as they perform some procedures. A surgeon may simultaneously narrate for an instructional video recording. Most, if not all, jurisdictions require surgeons to prepare and file notes that describe the surgeries they perform. Surgeons typically dictate such surgical notes after each procedure and send the recorded dictation to a transcription service. The transcription service prepares a transcript which the surgeon reviews, revises if necessary, and approves. The transcripts are typically kept by a hospital records department. The use of a separate commercial transcription service is slow and expensive.

Apart from specific medical requirements, two-way voice telecommunication is common and is becoming increasingly popular as new telecommunication services are developed. For instance, many people now own portable cellular telephones, and cellular telephone capability is now being integrated into personal digital assistants (PDAs). But persons performing manual tasks often require both hands to remain free. Thus hands-free communication capability is required. Such hands-free capability is typically provided by a headphone and speaker combination. But disadvantages of these combinations include the need for head size and microphone position adjustment when donning the headset, weight causing discomfort during prolonged use, and interference with corrective eyeglasses or other eye protection worn by the headset wearer. Other disadvantages include speakers, speaker cups, or ear canal inserts that block at least some ambient sound around the wearer. Such sound blocking is unacceptable in many situations, especially in an operating theater.

What is required is a device that allows medical personnel in particular, and other persons in general, to conduct hands-free communication. It is further desirable that such a device provide eye protection.

SUMMARY

Speakers and a microphone are mounted on eyeglasses suitable for use in an operating theater or for other uses. In one embodiment an earstem of the eyeglasses is formed into a speaker support loop. A speaker is supported by the support loop to be positioned over the wearer's external outer ear, but without touching the ear. In some embodiments the speaker is mounted in a speaker mount. The speaker mount is positioned in the support loop. In some cases the speaker mount rotates and/or slides in the support loop, thereby allowing the wearer to adjust the speaker position to be directly over the wearer's ear canal. If a second speaker is similarly supported over the wearer's opposite external outer ear, the wearer perceives the simultaneous sound output from both speakers significantly better than from a single speaker over one ear. Yet the gaps between the speakers and the ears allow the wearer to hear other external noise from various directions.

The microphone is mounted in the earstem or in a frame supporting one or more lenses in the eye protection portion. In some cases the microphone is directional and is oriented to selectively pick up the wearer's voice. Multiple microphones provide enhanced directional pickup.

Speaker position with respect to the wearer's ear is made adjustable. In one embodiment the speaker is placed in a speaker mount, and the speaker mount rotates within the support loop. The speaker is offset from the speaker mount's axis of rotation, and hence the speaker moves with respect to the support loop as the mount rotates. In another embodiment the speaker mount slides inside the loop, thereby allowing another speaker position adjustment.

The eye protection portion includes one or more corrective or non-corrective lenses. Configuration of such lenses varies and includes eyeglass lenses of conventional design, goggles, and face shields. In some cases the lens or lenses are tinted to assist the wearer by, for example, blocking light the ultraviolet spectrum (e.g., 400–280 nm).

Some eyewear embodiments include electronics for wireless communication. In other embodiments the wearer carries a unit that includes a wireless transceiver. The eyewear and the transceiver are coupled by a cord that includes one or more electrical wires carrying signals between the wearer unit and the speaker and microphone in the eyewear. The electrical cord is configured as a neck strap to support the eyewear around the wearer's neck when removed from the head.

BRIEF DESCRIPTION OF THE DRAWINGS

FIG. 1 is a perspective view showing an embodiment of protective eyewear for two-way communication.

FIG. 2 is a side elevation view showing illustrative wear of eyewear and wearer communication unit embodiments.

FIG. 3 is a front elevation view showing speaker position in relation to the wearer's ear.

FIG. 4 is a perspective view showing a second embodiment of protective eyewear for two-way communication.

FIG. 5 is a side cross-sectional and cutaway view of a speaker mount.

FIG. 6 is a top cross-sectional and cutaway view of a speaker mount.

FIG. 7 is a side elevation view of an earstem and speaker combination.

FIG. 8 is another side elevation view of an earstem and speaker combination.

FIG. 9 is a side cutaway view of an earstem portion.

FIGS. 10A, 10B, and 10C are cross-sectional views of an earstem.

FIG. 11 is a side cutaway view of a microphone housing embodiment.

FIG. 12 is a side elevation view of a second earstem and speaker combination.

FIG. 13 is a side elevation view of a third earstem and speaker combination.

FIG. 14 is a top plan view of an electrically conductive neck strap.

FIG. 15 is a perspective view showing a third embodiment of protective eyewear for two-way communication.

FIG. 16 is an exploded perspective view showing a speaker mount assembly.

FIG. 17 is a cross-sectional view of a speaker mounted in a support housing.

FIGS. 18A and 18B are exploded perspective views of a microphone housing.

FIGS. 19A and 19B are views illustrating microphone directional pickup patterns.

FIG. 20 is a cross-sectional view of a microphone mounted in a microphone housing.

FIG. 21 is a diagrammatic view of a communication system using eyewear for communication.

FIG. 22 is a diagrammatic view of functional blocks in a wearer unit.

FIG. 23 is a diagrammatic view of functional blocks in a base station and associated devices.

FIG. 24 is a diagrammatic plan view of operating theaters.

FIG. 25 is a diagrammatic view of a second communication system using eyewear for communication.

DETAILED DESCRIPTION

The accompanying drawings are not necessarily to scale. Like numbers in the drawings identify the same or substantially similar elements. Some well known mechanical and electrical components (e.g., hinges, battery or photoelectric power supplies, electrical busses) have been omitted from the drawings so that embodiments may be more clearly shown and described. The embodiments described herein are illustrative and are not limited to the medical field. Skilled artisans will understand that many variations of the described embodiments exist. In addition, the following disclosure describes machine functions such as voice recognition, voice operated command and control, and use of the BLUETOOTH communication protocol. Such functions are well known and skilled artisans will be able to easily modify commercially available software to operate in accordance with this disclosure.

FIG. 1 is a perspective view showing an embodiment of eyewear for two-way communication used, for example, in a surgical theater. Eyeglasses 100 are illustrative of many embodiments that include conventional eyeglasses configurations and eye protection gear such as goggles and face shields. Eyeglasses 100 include eye protection portion 102, left earstem 104, and right earstem 106. Eye protection portion 102 protects the wearer's eyes from, for example, body fluid splashes and other foreign objects that may erupt during surgery. Earstems 104, 106 rest on the wearer's external outer ears and help hold eye protection portion 102 on the wearer's head.

Eye protection portion includes left lens 108 and right lens 110 coupled by nose bridge 112. Nose pads 114 are coupled to nose bridge 112. The eyeglasses 100 shown in FIG. 1 are frameless—there is no supporting frame around the lenses. An illustrative framed embodiment is described below. In some instances lenses 108, 110 are corrective lenses. Some lenses 108, 110 correct the wearer's vision for near work on a surgical patient. Other lenses 108, 110 correct the wearer's vision for both near and more distant vision (i.e., bifocals) so that the wearer clearly sees, for example, both the patient and a video monitor displaying an endoscope camera image. In some instances lenses 108, 110 are non-corrective.

Lenses 108, 110 may be tinted to reduce the wearer's eyestrain and/or to improve visual contrast in the wearer's field of view. In some cases an antireflective coating is formed over the lenses. In some cases the lenses are treated with a hydrophobic agent (functioning, for example, similar to RAIN-X, marketed by Blue Coral-Slick 50, Ltd., Cleveland Ohio) that enables fluid to more easily run off the lenses. In some cases the lenses attenuate transmitted light as sunglasses (e.g., RAY-BAN G-15 tint lenses, manufactured by Bausch & Lomb Incorporated).

Earstem 104 includes temple portion 116, speaker support loop 118, and ear piece 120. FIG. 1 shows that earstem 104 is configured as a single, continuously curving piece that forms temple portion 116, support loop 118, and ear piece 120. Speaker support loop 118 holds speaker mount 122 such that speaker 123 is positioned over the wearer's ear canal. In some cases speaker mount 122 is omitted and speaker 123 is directly held by support loop 118. In FIG. 1, support loop 118 is shown open on one end. A support piece may be added across the open end of loop 118. FIG. 1 also shows that the sides of support loop 118 are straight, although in some instances one or both sides of support loop 118 may be curved.

FIG. 2 illustrates wear of an embodiment, showing the position of earstem 104 on the wearer's head. Ear piece 120 rests on the wearer's external outer ear. Loop 118 supports the speaker over the wearer's ear.

FIG. 3 is a front view showing a detail of the speaker mount 122 position (hence, speaker 123 position) in relation to the wearer's ear. As shown in FIG. 3, support loop 118 is configured such that speaker mount 122 is held away from the wearer's ear so that a gap 300 exists between speaker 123 and the wearer's external outer ear. Gap 300 is made large enough so that external sound is not obstructed from reaching the wearer's ear canal. Support loop 118 is rigid so that speaker mount 122 cannot be inadvertently pushed against the wearer's outer ear during use. In some cases speaker mount 122 position is adjustable to allow the speaker to be aligned with the wearer's ear canal, as described below. Since there is no contact between speaker mount 122 and the wearer's outer ear, speaker mount 122 does not obstruct the wearer's hearing from any angle. Any foam pads surrounding speaker 123 do not touch the outer ear. There are no cups that typically fit against the wearer's head in order to block external sound as in conventional headphones. If desired, however, support loop 118 can, in some instances, be modified so that mount 122 touches the external outer ear.

Referring again to FIG. 1, microphone housing 124 is integral to (formed as a continuous part of) temple portion 116 of earstem 104. In a surgical operating theater, much of the wearer's lower face is typically covered by a surgical mask and much of the head is covered by a surgical cap. Although a large housing or a boom can be used to position a microphone close to the wearer's mouth, medical personnel, especially surgeons, prefer to keep as much equipment as possible away from their face and away from the mask and cap. If a boom is used, the microphone position can be altered if the boom is displaced when removed from the wearer's head. A boom can snag on other objects. Thus an advantage of the integral microphone housing is that the wearer is unaware of the microphone's presence. The microphone remains in the correct position during eyeglasses use and storage, and no microphone position readjustment is required. Microphone housing 124 is in one instance a space in which a microphone is placed. In other instances microphone housing 124 is, for example, a separate piece fitted into the eyeglasses that holds the microphone.

To assist picking up the wearer's voice, housing 124 is located on earstem 104 to be close to the wearer's mouth. In other instances, however, housing 124 is located elsewhere on eyeglasses 100 (e.g., on support loop 118, on a frame surrounding one of the lenses (FIG. 4)). In FIG. 1, microphone housing 124 is shown extending from temple portion 116. In other instances in which temple portion 116 is sufficiently large, or the microphone is sufficiently small, housing 124 is coextensive with temple portion 116 so that there is no significant change in the cross section of the earstem in the microphone housing portion. Making the microphone housing coextensive with the shape of the earstem reduces accidental wear on or breakage of the housing. Additional microphones are used in some embodiments to improve sound pickup quality. Such additional microphones are placed in various positions, such as on the same earstem, the opposite earstem, or on a frame supporting the lenses. The use of more than one microphone in various positions to improve sound pickup directionality allows the wearer's voice to be sensed more clearly and extraneous background noises to more easily be canceled. Consequently, enhanced directionality improves performance of, for example, voice recognition software executed by digital signal processors described below, and improves the quality of the wearer's voice for remote conversation or for recording as dictation.

The wearer's voice is carried through opening 126 to the microphone (not shown) inside housing 124. Accordingly, opening 126 is aligned in the direction of the wearer's mouth.

In one instance the configuration of the right side of eyeglasses 100 is essentially a mirror image of the left side as described above. In other instances, unnecessary features may be omitted from either the left or right sides. In embodiments in which only a left side speaker is used, for example, the support loop 118 is omitted from right earstem 106. The inventors have discovered, however, that excellent sound quality is provided when a speaker (e.g., speakers in mounts 122, 128 as shown in FIG. 1) is positioned over each of the wearer's intertragial notches, even though the speakers are held away from the external outer ears.

FIG. 4 is a perspective view showing a second embodiment of eyeglasses for two-way communication. Eyeglasses 400 are similar to eyeglasses 100, but illustrate a different configuration of the eye protection portion. As shown in FIG. 4, eye protection portion 402 has an illustrative frame 404 surrounding the lenses. Frame 404 is conventionally coupled to earstems 104, 106. Depending on the desired configuration, portions of frame 404 may be omitted (e.g., to reduce weight). The eye protection portion 102, 402 may be made larger to protect other parts of the wearer's face. In some instances the microphone (not shown) in the eyeglasses is mounted in a microphone housing embodiment positioned in frame 404. For example, the microphone may be mounted in the lower part 406 of frame 404, near the wearer's mouth. Opening 408, allowing sound to reach the microphone, is on the underside of frame 404 and is not visible in this view. FIG. 4 also illustrates a microphone housing 410 embodiment that is coextensive with the shape of temple portion 116 of earstem 104. Although FIGS. 1 and 4 illustrate embodiments that include both speakers and a microphone, in other cases embodiments are configured with only a microphone or only one or more speakers.

Earstems 104, 106 and the frame supporting lenses 108, 110 are made from a rigid material such as plastic (e.g., SPX plastic), metal (e.g., titanium), or metal alloy (e.g., titanium alloy). An advantage of using an electrically conductive material for at least a portion of eyeglasses 100 is that the electrically conductive material helps to shield electrical wiring and components in the eyewear against electromagnetic interference. In some instances a combination of plastic and metal is used to make eyewear 100. Conventional wearer comfort features, such as soft rubber pads on the ear pieces, are used in various embodiments. For embodiments in which the eyewear is intended for use during surgery or other medical procedures, the exposed materials in the eyewear are tolerant of wipedown using disinfecting solutions (e.g., alcohol). In some cases the wearer should be cautious not to use a disinfecting solution that removes an optical coating on the lenses that is soluble by the disinfecting solution.

In some cases several sizes of eyeglasses 100, 400 are provided to fit various wearer head sizes. Further fitting to the wearer's head is conventionally done (e.g., by bending the earstems).

FIG. 5 is a side cutaway view of speaker mount 122. Channel 502 separates speaker housing 504 and retaining portion 506. A portion of support loop 118 (FIG. 1) rests in channel 502. Channel 502 is circular so that speaker mount 122 rotates within support loop 118 around axis 508. In one instance the fit between loop 118 and mount 122 is tight enough so that mount 122 is held in place by friction.

In the embodiment shown in FIG. 5, conductive pad 510 is positioned in channel 502 and makes contact with a corresponding conductive strip positioned on the inside of loop 118, described below. Conventional small speaker 123 is positioned in speaker housing 504 and is conventionally held in place using, for example, adhesive or a press fit. In some instances the surface 514 closest to the wearer's ear is covered by a conventional protective layer (e.g., foam) (not shown). FIG. 5 shows that speaker 123 is mounted off-axis from axis 508. Hence speaker 123 moves in relation to support loop 118 as mount 122 rotates. In some instances, however, speaker 123 is coaxially mounted with axis 508.

In some instances housing 122 is omitted and speaker 123 is mounted directly inside loop 118. In such instances the speaker 123 terminals and conductors in earstem 104 are conventionally coupled.

FIG. 6 is a top combined cross-sectional and cutaway view of speaker mount 122 taken at cut line 6—6 in FIG. 5.

FIG. 6 shows circular channel 502 and the oblong shape of speaker housing 504. Contact pad 510 is electrically coupled to one terminal 602 of speaker 123. A similar contact pad 604 is electrically coupled to another terminal 606 of speaker 123. Contact pads 510, 604 are positioned in channel 502. Electrical contact is maintained between contact pads 510, 604 and conductors in loop 118 as housing 122 rotates within loop 118.

FIG. 7 is a side view illustrating speaker mount 122 rotation within loop 118. The speaker (not shown), being mounted in end 702 of mount 122 that is distal from axis of rotation 508, moves approximately vertically as mount 122 is rotated. This rotational movement, illustrated by the double headed arrow, permits the wearer to position the speaker with respect to the ear canal as, for example, mount 122 is moved to alternate position 704. In one instance the friction between loop 118 and mount 122 holds mount 122 in the selected rotational position. In other instances, mount 122 is held in the selected rotational position by detents (e.g., making channel 502 polygonal rather than circular) or other conventional methods of preventing rotation. In some embodiments mount 122 rotates at the distal end of loop 118 as shown in FIG. 7. Thus embodiments of eyeglasses 100, 400 are made that include different lengths and angles of loop 118, as well as different sizes of other components (e.g., different temple lengths) to accommodate various wearers' head anatomy. In other embodiments mount 122 rotates within loop 118 at various translational positions within loop 118.

FIG. 8 is a side view illustrating an embodiment of speaker mount 122 translational movement within loop 118. As mount 122 slides within at least a portion of loop 118, as illustrated by the double headed arrow, the speaker (not shown) is also moved. Thus the wearer adjusts the speaker position with respect to the ear by sliding mount 122 to, for example, alternate position 802. In one instance friction prevents unwanted mount 122 movement within loop 118. Translational movement is further inhibited in other instances by using, for example, detents or other conventional methods of preventing movement.

FIG. 9 is a side cutaway view of a detail of the distal end of loop 118. As shown in FIG. 9, two electrically conductive contact strips 902, 904 are inlaid into the interior surface of loop 118. When mount 122 (not shown) is positioned within loop 118, contact pad 510 (FIGS. 5, 6) is electrically coupled to contact strip 902 and contact pad 604 (FIG. 6) is electrically coupled to contact strip 904. Since contact pads 510, 604 run along channel 502, the contact pads maintain electrical contact with the contact strips as mount 122 rotates. Similarly, since the contact strips extend along the inside of loop 118, electrical contact is maintained as mount 122 slides within loop 118.

As shown in FIG. 9, several electrical wires 906 are positioned along earstem 104. In the embodiment shown in FIG. 9 there are three wires. Wire 908 is coupled to contact strip 902 and conducts a signal used to activate one terminal of speaker 123. Wire 910 is coupled to contact pad 904 and carries an electrical ground potential that is used on the other terminal of speaker 123. Wire 912 carries a signal from the microphone, as described below. The number of wires, the signals carried by the wires, and the contacts are illustrative of various methods of routing electrical signals. In some embodiments wire 912 is shielded and the shield is coupled to wire 910.

FIGS. 10A, 10B, and 10C are cross-sectional views taken at cut line 10—10 in FIG. 9 of various wire routing embodiments. In FIG. 10A, wires 906 are shown laid within groove 1002 channeled into earstem 104. Wires 906 are held in groove 1002 using, for example, adhesive or a filling material (not shown) packed into the rest of the groove, or in some instances by crimping the surrounding earstem material. In FIG. 10B, wires 906 are shown routed through a hollow center channel 1004 within earstem 104. In FIG. 10C, wires 906 are shown molded into earstem 104 (e.g., using an injection molding process). In some cases the earstem and/or frame is made from electrically conductive pieces separated by insulators, each piece carrying one or more microphone or speaker signals.

Referring again to FIGS. 7 and 8, another method of electrically connecting the speakers to the earstems is shown. Wire loop 706 connects the speaker terminals to the wires carried in earstem 104. Wire loop 706 is made sufficiently large to allow rotational and translational movement of speaker housing 122. The methods of providing electrical contact between the speaker and the conductors in the eyewear are illustrative of many conventional connection methods. Similar connection methods (e.g., wire loop, conductive hinge design) are used between the earstem and the eye protection portion when the earstem is hinged to the frame supporting the lenses and the microphone is mounted in the eye protection portion. However, the electrical connection design that omits or covers a conductive wire loop, as illustrated in FIGS. 5–9, eliminates problems such as loop breakage or loop snagging on other equipment.

In some embodiments, electrical components and wiring in eyeglasses 100, 400, and in the other system components described below, are constructed to comply with surgical theater safety standards. In some instances the wires 906 are conventional coaxial wires having a grounded sheath to provide electromagnetic shielding from outside electromagnetic interference (EMI) from, for example, electrocautery. In some instances, the earstem 104 material provides EMI shielding. In some instances electrical components operate using 3 volt technology and virtually no electrical power is passed through the eyeglasses. Consequently, the signals carried in the eyeglasses, and in the other system components, do not cause EMI for nearby medical equipment. The shielding used to prevent outside EMI also prevents EMI originating in the eyeglasses and other system components. Thus many conventional EMI protection configurations are used in various embodiments.

FIG. 11 is a side cutaway view showing a microphone mounting embodiment. Microphone 1102 is shown positioned within microphone housing 124. One microphone terminal 1104 is coupled to wire 910. Another microphone terminal 1106 is coupled to wire 912. Microphone case opening 1108 to the microphone pickup element is positioned to be aligned with opening 126 in earstem 104. Openings 126, 1108 are oriented to pick up the sound originating from the wearer's mouth. It is known that microphone directionality is achieved by various microphone case shapes and various positions of openings allowing primary and secondary sound pressure to reach the microphone pickup element (e.g., holes positioned on opposite sides of the microphone casing). Therefore, microphone opening 1108 and earstem opening 126 are illustrative of microphone 1102 directionality that picks up the user's voice while attenuating background noise (i.e., directional microphone pointed at the wearer's mouth).

Microphone 1102 is in some cases a conventional electret condenser microphone. In other instances other microphone types are used. In some instances microphone 1102 is held in position by friction or adhesive. In other cases microphone 1102 is molded into the earstem or into the lens frame.

FIG. 12 illustrates another speaker mounting embodiment. Earstem 1202 includes temple portion 1204, speaker support extension 1206, and ear support portion 1208. Speaker extension 1206 is an integral part of earstem 1202. Speaker mount 1210 includes the conventional speaker (not shown) and includes sleeve 1212 that fits over extension 1206. Sleeve 1212 slides along extension 1206, as illustrated by the double headed arrow. As shown in FIG. 12, two contact strips 1212, 1214 are positioned on extension 1206. Contact pads (not shown) similar to pads 510, 604 (FIGS. 5, 6) are positioned inside sleeve 1212 so that an electrical connection is established and maintained between wires in earstem 1202 and the speaker as sleeve 1212 slides. Other electrical contact configurations (e.g., wire loop) between the earstem and the speaker are used in other embodiments. Unwanted sleeve 1212 movement is conventionally prevented (e.g., using friction, detents). In some cases mount 1210 is oblong and rotates with respect to sleeve 1212 as described above with reference to loop 118, thereby providing more precise adjustment in relation to the wearer's ear canal. In some cases, extension 1206 is bendable to position the speaker over the ear canal.

FIG. 13 illustrates yet another speaker mounting embodiment. As shown in FIG. 13, speaker mount 1302 is fixed to speaker support extension 1206. Adjustment is made to the user's ear by bending extension 1206.

FIG. 14 is a top view showing flexible electrical cord 1402 attached to an eyeglasses 100 embodiment and terminating in a conventional plug 1404 (e.g., miniature phone plug). As described below, plug 1404 is inserted into a wireless wearer unit carried by the wearer, a cellular telephone, or a personal digital assistant. As shown in FIG. 14, cord 1402 is split and is connected to the ends of the ear support portions 120, 121 of earstems 104, 106, respectively. In some instances cord 1402 is permanently attached and in other instances cord 1402 is made removable by using, for example, locking bayonet connectors of conventional design. In some instances a plastic or rubber sleeve protects the connection between cord 1402 and eyeglasses 100. Conductors (e.g., wires) within cord 1402 carry signals for the wires (e.g., 906 as shown in FIG. 9) in earstems 104, 106.

Cord 1402 acts as a retaining neck strap to support eyeglasses 100 around the neck when the eyeglasses are removed from the head. The connection between cord 1402 and eyeglasses 100 is made strong enough to support the weight of the eyewear. Cord 1402 is illustrative of many eyewear retaining strap designs that may be used, such as eyewear retaining strap designs marketed under the CROAKIES trademark. Hence in some instances the connection between cord 1402 and eyeglasses 100 is not necessarily at the ends of the earstems. In instances in which all wireless communication electronics are incorporated into eyeglasses 100, instead of into a separate wearer pack described below, cord 1404 is in one instance a conventional retaining strap and in another instance includes, for example, an antenna.

FIG. 2 shows illustrative wear of electrical connecting cord 1402 attached to eyeglasses 100. As shown in FIG. 2, the wearer carries wireless (e.g., radio) wearer unit 200 illustratively mounted on the belt. Wearer unit 200 may be worn in various positions, although the unit is generally positioned so that cord 1402 does not interfere with the wearer's actions, for example, during surgery. In other instances cord 1402 is coupled to eyewear 100 at positions other than the ends of the earstems (e.g., at the temples). In one instance wearer unit 200 is combined with eyeglasses 100, and in this case a separate neck strap may be used to support eyeglasses 100 around the wearer's neck as described above. The supporting frame for the combined eyeglasses and wearer unit is made large enough to accommodate the required electronics, antenna, and power supply (e.g., battery, photocells). Although the connection between the eyeglasses and the wearer unit is shown as a neck strap, in some cases a single electrical cord couples the eyeglasses and the wearer unit.

FIG. 15 is a perspective view of another embodiment of eyeglasses for two-way communication. Eyeglasses 1502 include frame 1504 supporting left and right lenses 1506, 1508 respectively, thereby forming an eye protection portion. Lenses 1506, 1508 are, for example, polycarbonate infused with dye to tint the lenses to, for example, (L*= 98.16, a*=−8.85, b*=22.91) or (L*=97.16, a*=−13.17, b*=28.00) in the CIELAB system and are made by a lens foundry such as SOLA OPTICAL ITALIA, S.P.A. of Milan Italy. Such tints transmit a maximum of 2 percent average ultraviolet light intensity in the 400–280 nm range, and transmit a minimum of 95 percent of average light intensity associated with brightness perception based on photopic response (e.g., 630–500 nm).

Frame 1504 further includes nose bridge portion 1509. Left earstem 1510 includes temple portion 1512, support loop 1514, and ear piece 1516. Some right earstem 1518 embodiments are a mirror image of left earstem 1510, with only minor variations depending on microphone position. The microphone housing and microphone described below may be mounted in either one or both of earstems 1510, 1518, or in frame 1504. The left earstem microphone position embodiment is illustrative. As shown in FIG. 15, an upper directional opening 1520 is made in temple portion 1512. A lower directional opening (not shown) is opposite opening 1520. Frame 1504 and earstems 1510, 1518 are made of, for example, titanium or plastic. Speaker mount assembly 1522 is mounted in support loop 1514.

FIG. 16 is an exploded perspective view of a speaker mount assembly 1522 embodiment. As shown in FIG. 16A, support track 1602 is positioned in support loop 1514. Opposing track rails 1604 define channel 1606 extending through support track 1602. Track 1602 is sandwiched between speaker support housing (speaker mount) 1608 and slider 1610. Rib 1612 on slider 1610 extends into channel 1606 such that flange 1614 rests against the outside (away from the wearer) of rails 1604. Slide tab 1616 of housing 1608 rests against the inside (near the wearer) of rails 1604. Screw 1618 extends through tab 1616 and channel 1606, and engages slider 1610. Tightening screw 1618 holds mount 1608 against track 1602. Loosening screw 1618 allows the wearer to adjust housing 1608 position with respect to the ear. Slider cover 1620 is fitted over slider 1610 on the outside of track 1602.

Speaker cover 1622 covers speaker chamber 1624 defined in housing 1608. A speaker (not shown) is positioned in chamber 1624. Holes 1626 extend from chamber 1624 through housing 1608 so as to provide acoustic balance for the speaker, thereby reducing unwanted sound output for the wearer. Holes 1628 direct sound from the speaker to the ear. During use, assembly 1522 is adjusted so that the speaker in housing 1608 is positioned opposite the intertragial notch in the ear. Support portion 1514 and support assembly 1522 are configured such that housing 1608 is held slightly away from the ear, although a portion of housing 1608 may touch the pinna. Thus, housing 1608 is sized and positioned such that sound other than from the speaker reaches the concha, thereby preserving the wearer's ability to hear environmental sounds without any significant obstruction. The speaker is driven to produce about 80–85 dB at the acoustic standard ear reference point. Since the speaker is close to the ear, its sound causes little or no distraction to other nearby people. The loop connects to wires in channel 1640 in earstem 1510.

The electrical connection between the speaker and conductive lines in the earstem is via a wire loop as described above. The loop is routed through gap 1630 in track 1602 and a small hole (not shown) in housing 1608.

FIG. 17 is a cross-sectional view taken at cut line 17—17 in FIG. 15. As shown in FIG. 17, speaker 1702 (e.g., MWM Acoustics, LLC, of Indianapolis, Ind., part. no. DH87D5 13 mm receiver) is mounted in housing 1608 and is held in place by cover 1622. Acoustic loading in cavity 1704 (e.g., 1–2 mm deep) behind speaker is released by 1.5 mm diameter holes 1626 (12 holes 1626 are used in the embodiment shown). Cavity 1706 in front of speaker 1702 and holes 1628 are sized to prevent acoustic resonance outside the telephony bandwidth. In one embodiment, cavity 1706 is about 0.5 mm deep and there are 12 holes 1628, each 1.0 mm in diameter. The speakers on earstems 1510, 1518 are driven in phase.

FIGS. 18A and 18B are exploded perspective views of a microphone housing portion of earstem 1510. A microphone housing in earstem 1518 is a mirror image. As shown in FIG. 18A, cavity 1802 is formed in earstem 1510 into which a microphone (not shown) is positioned. When the microphone is in position, an approximately U-shaped airspace remains on the outside (away from the wearer) the microphone and extends to the environment via upper directional opening 1520. The U-shaped airspace is tilted slightly backward. Referring to FIG. 18B, microphone housing cover 1804 has an approximately inverted U-shaped cavity. When cover 1804 is fitted into notch 1806 in earstem 1510, an approximately inverted U-shaped airspace remains on the inside (near the wearer) the microphone and extends to the environment via lower directional opening 1808. The inverted U-shaped airspace is tilted slightly forward. The tilt of the U-shaped and inverted U-shaped airspaces is on a line between the microphone position in the earstem and the wearer's mouth when viewed from the side. In addition, the inside-outside offset of lower directional opening 1808 and upper directional opening 1520 is also on a line between the microphone position and the wearer's mouth when viewed from the front. The microphone positioned in cavity 1802 is a gradient microphone, responsive to differences between sound pressures on opposing sides, and directionality is established towards the wearer's mouth.

FIGS. 19A and 19B illustrate microphone directionality in embodiments of eyeglasses 1502. As seen in FIG. 19A, lower directional opening 1808 provides a primary pickup zone 1902 towards the wearer's mouth. Upper directional opening 1520 provides a secondary pickup zone 1904 up and away from the wearer in a direction from which little sound originates. FIG. 19B shows another view of zones 1902, 1904. FIG. 19B also shows a benefit of using two microphones symmetrically mounted on the eyeglasses. Primary pickup zones 1902 and 1906 may be additive, providing an additional boost over sounds detected in secondary pickup zones 1904 and 1908. Thus pickup of the wearer's voice is further enhanced while unwanted background noise is reduced. The one or more microphones may be used in combination with conventional noise cancellation software which is easily modified for use in these embodiments.

Referring again to FIGS. 18A and 18B, wires (not shown) for the microphone are positioned in channel 1810 (FIG. 18A) and pass through notch 1812 (FIG. 18B) in cover 1804. To prevent cross-talk with wires driving the speakers, the positive wire leading to the microphone is shielded and, in some instances, coupled to ground and/or the negative speaker terminal. Referring to FIG. 16, in one embodiment wires for the speaker and microphone are fitted into channel 1640 defined in earstem 1510. Wires in eyeglasses 1502 are coupled to cord 1402 as described above.

FIG. 20 is a cross-sectional view taken at cut line 20—20 in FIG. 15. As shown in FIG. 20, microphone 2002 (e.g., MWM Acoustics part no. NM4518) is mounted in cavity 1802 (FIG. 18A) on rubber mount 2004. Openings 1520 and 1808 are about 1.0 mm wide.

FIG. 21 is a diagrammatic view of a communication system using eyeglasses configured for two-way communication (e.g., eyeglasses 100, 1502). The system is not limited to use with embodiments of the eyeglasses, and other head-mounted communication apparatus 2101 (e.g., conventional head-mounted video displays) may be coupled to wearer unit 200. As shown in FIG. 21, wearer unit 200 communicates with base station 2102 using the BLUETOOTH wireless protocol to carry information in one or more channels (e.g., audio, data) via signals 2104. Either unit 200 or base station 2102 may be designated as the master BLUETOOTH device. Base station 2102 may be any BLUETOOTH-capable device such as one designed for a specific application (e.g., hospital use), a desktop or laptop computer, or small personal digital assistant. Embodiments are not restricted to BLUETOOTH, and other wireless protocols may be used. In the illustrative embodiment shown in FIG. 21, base station 2102 is coupled via CODEC port 2106 to conventional telephone receiver 2108. Receiver 2108 may be coupled to various systems 2110, such as a POTS line, a PBX line, or a secure web server in a hospital network. Base station 2102 may be coupled to systems 2110 via port 2112 without passing through receiver 2108. Thus a person (e.g., a surgeon) wearing a two-way communication device (e.g., eyeglasses 100, 400, 1502) may, for example, confer with another person (e.g., a pathologist), receive data (e.g., patient records, diagnostic images).

Base station 2102 may also be coupled to various equipment 2114 (e.g., medical devices in an operating theater) so as to exchange data and/or control commands. For example, the wearer speaks a voice request for data (e.g., "insuflator, pressure"), the request is relayed to the insuflator which in response outputs pressure data that is passed back to the wearer who receives the data as a synthesized voice (e.g., "insuflator, 200 millimeters of mercury"). In a similar manner, for example, the surgeon may speak a command to control a device (e.g., "insuflator, increase pressure 10 millimeters of mercury"). The controlled device may request confirmation to prevent errors. In still another illustrative command and control example, a surgeon makes a voice command to adjust the white color balance of a monitor displaying an image from a surgical camera (e.g., endoscope). The signal processing required for voice activated data reception and command and control may be carried out using one or more digital signal processors (DSPs) executing software (e.g., conventional voice recognition and synthesis software, which is easily modified for use in specific applications in light of this specification).

Devices 2114 are also illustrative of an audio/video (AV) recorder. The wearer narrates an audio recording using eyeglasses 100 during a video recording of, for example, a surgical procedure. The surgeon's narration is output by base station 2102 as an audio input to the AV recorder.

In some cases equipment 2114 is BLUETOOTH capable and wearer unit 200 communicates directly with equipment 2114 via signals 2116 without using base station 2102 (i.e., a BLUETOOTH-capable device 2114 need not be coupled to a base station). In one illustrative application, device 2114 is a terminal supplying patient information (e.g., records, diagnostic images). As the BLUETOOTH protocols in unit 200 and device 2114 identify each other as a physician wearing eyeglasses 100 comes within range of device 2114, specific information (e.g., name, general diagnosis) for a patient associated with device 2114 (e.g., a patient lying in a hospital bed near device 2114) is automatically sent to unit 200 and output to the physician. The physician may speak commands so as to receive additional information (e.g., recent laboratory results, x-ray images) about that particular patient.

FIG. 22 is a diagrammatic view of functional blocks in an illustrative wearer unit 200. The wearer unit 200 embodiment shown in FIG. 22 includes transceiver 2202, baseband processor 2204, digital signal processor (DSP) 2206, program memory 2208, eyewear interface unit 2210, and removable memory unit 2212. Transceiver 2202 and baseband processor 2204 together are included in radio module 2214. In one instance wearer unit 200 is constructed using 3.3 volt technology electronics.

Transceiver 2202 transmits signals to and receives signals from, for example, base station 2102 and/or devices 2114 via antenna 2216 which is coupled to transceiver 2202. In one instance transceiver 2202 is a conventional 2.4 gigaHertz (GHz) transceiver such as ones used in Digital Enhanced Cordless Telecommunications (DECT) systems and cordless telephones.

Baseband processor 2204 is, for example, a conventional BLUETOOTH baseband processor with software and/or firmware that manages the hardware portion of the BLUETOOTH interface protocol. Radio module 2214 is typically sold as a complete package and is available from various vendors such as Texas Instruments Incorporated headquartered in the United States, Telefonaktiebolaget LM Ericsson (Ericsson Electronics) headquartered in Sweden, and Koninklijke Philips Electronics N.V. (Royal Philips Electronics) headquartered in the Netherlands. The use of BLUETOOTH communication protocol is illustrative of other protocols.

DSP 2206 processes the BLUETOOTH stack software and applications software such as echo cancellation, voice recognition, command and control, speech compression, and speech synthesis. In one instance DSP 2206 is a Texas Instruments DSP part no. TMS320VC5402PGE100. In some instances DSP 2206 executes noise reduction software (e.g., echo canceling) that improves the sound quality originating at the one or more microphones mounted on the eyewear. Noise cancellation software is commercially available (e.g., from Texas Instruments, Incorporated), and modification of such software for this application is easily accomplished in light of this disclosure.

Positioning DSP 2206 in wearer unit 200 allows the wearer unit to be customized to the wearer. In some instances each wearer unit 200 is programmed with a unique identification code (e.g., BLUETOOTH address). Hence the unique code also identifies a particular wearer associated with the wearer unit. Devices receiving signals from the wearer unit also receive the wearer unit's identification number. Devices sending information to a particular wearer unit address the sent information by using the identification number. In some instances each wearer unit is customized to recognize the wearer's voice and to recognize particular voice commands. For example, voice recognition software executed by DSP 2206 discriminates between the wearer's voice and other nearby voices. In another example, command and control software executed by DSP 2206 recognizes a command customized to the wearer (e.g., "call home" to initiate a telephone call to the wearer's home). In applications in which the number of wearers is limited, however, some of these DSP functions may be carried out by a DSP in a base station, as described below.

Memory 2208 is coupled to DSP 1506 and stores both software used to process the BLUETOOTH program stack and application program software. Memory 1508 is, in one instance, conventional flash memory. The use of flash memory allows software upgrades to be made in the field. Other memory types or combinations of types are used for memory 2208 in other embodiments.

Eyewear interface unit 2210 is coupled to DSP 2206 and provides an analog interface (e.g., CODEC) between DSP 2206 and the microphone and speakers in eyeglasses 100, 400, 1502. Plug 1404 is inserted into terminal 2218. In embodiments in which a digital-capable device (e.g., video display) is coupled to terminal 2218, interface unit 2210 provides a digital interface. In some cases a separate processor (not shown; e.g., a programmable logic device (PLD) as described below) is coupled between interface unit 2210 and DSP 2206 to provide another communication port for unit 200.

In some embodiments removable memory unit 2212 is coupled to DSP 2206. Memory unit 2212 is in some embodiments a conventional flash memory card read/write device that receives removable memory module 2215 (e.g., compact flash memory card) Module 2215 stores information from DSP 2206 (e.g., digitized recordings of the wearer's speech) and/or stores information used by DSP 2206 (e.g., upgrades for software stored in memory 2208). In some instances the audio information from the microphone in the eyeglasses is compressed by DSP using conventional compression technology for storage on module 2215. Various embodiments store digitized audio in various file formats (e.g.,.wav,.mp3) to comply with the device receiving the recorded audio.

Certain elements are omitted from some wearer unit 200 embodiments so as to make the wearer unit lighter. As shown in FIG. 21, for example, wearer unit 2120 omits removable memory unit 2214, DSP 2206, and memory 2208. Interface unit 2210 couples the microphone and speakers in, for example, eyeglasses 100 with radio module 2214. Wearer unit 2120 hangs at the bottom of the neck strap. In some instances unit 2120 may be made small enough to be mounted directly on an embodiment of eyeglasses 100.

FIG. 23 is a diagrammatic view of an illustrative base station embodiment 2300. As shown in FIG. 23, base station 2300 includes transceiver 2302, baseband processor 2304, DSP 2306, program memory 2308, interface unit 2310, and removable memory unit 2312. Transceiver 2302 and baseband processor 2304 together are included in radio module 2314. Base station 2300 also includes PLD 2318 and user control unit 2320.

In the embodiment shown in FIG. 23, the majority of base station 2300 components are the same as or are substantially similar to the wearer unit 200 components described above with reference to FIG. 22. Thus for the embodiments depicted in FIGS. 22 and 23, transceivers 2202, 2302, baseband processors 2204, 2304, radio modules 2214, 2314, DSPs 2206, 2306, program memories 2208, 2308, removable memory units 2212, 2312, removable memory modules 2215, 2315, and antennas 2216, 2316 are the same or are substantially similar. In some cases the removable memory units 2212 and/or 2312 are omitted.

In the base station 2300 embodiment shown in FIG. 23, PLD 2318 (e.g., Lattice Semiconductor Corporation part no. ISPLSI2096VL100LT128) provides an asynchronous port (e.g., Host Computer Interface (HCI) port) in addition to synchronous ports (e.g., Synchronous Communication Oriented (SCO) port) provided by DSP 2306.

User control unit 2320 allows a person to route information from any input to any output in base station 2300. For example, in a default setting a call incoming from telephone system 2322 arrives at telephone 2324 (located, for example, in an operating theater). When handset 2326 is lifted and pickup is sensed, the call is routed through ports 2328 and 2330 to handset 2326. The person answering the call (e.g., a nurse) determines the intended recipient and presses a button on control unit 2320 to route the call via radio unit 2314 to the recipient (e.g., a surgeon) who is associated with a particular wearer unit address (e.g., BLUETOOTH address). The wearer then conducts the call using the speakers and microphone in the eyeglasses. Another wearer (e.g., another surgeon) may be switched into the conversation by pressing another control unit 2320 button. An outgoing call may be made using similar actions to associate an eyeglasses wearer with telephone 2324 and then dialing a desired number. In voice-controlled embodiments a wearer may dial a number using voice commands for hands-free dialing (e.g., speaks the command "dial telephone" and then speaks the numbers). In some embodiments the base station is assigned a particular telephone number and the inbound caller is presented with a menu (e.g., synthesized voice) of BLUETOOTH addressees currently communicating with the base station (each BLUETOOTH address being associated with a particular name). The caller selects the called party from the menu. Device 2332 coupled to port 2334 is illustrative of other devices and systems 2110, 2114 described above with reference to FIG. 21.

In some instances DSPs 2206, 2306 in wearer unit 200 and/or base station 2102, respectively, provide digital audio recording capability. The wearer's digitized voice is recorded by one of the removable memory units 2212, 2312 onto removable memory module 2215, 2315, respectively. Illustratively, the surgeon dictating surgical notes may do so during the surgery or afterwards. Providing the wearer hands-free dictation capability during surgery advantageously saves time since the wearer does not have to spend time after surgery dictating notes. Or, the wearer may choose to dictate notes after each surgery. Providing the removable memory unit in wearer unit 200 allows the wearer to move outside base station communication range and still complete dictation. In situations in which base station 2102 communicates with several eyeglasses 100, multiple removable memory units 2312 are provided to allow each wearer to record on a unique memory module 2315.

Once the wearer's dictation is recorded on module 2215 or module 2315, various methods are used to transcribe the recorded dictation. In one instance the wearer forwards the removed module to a transcription service. In another instance the wearer inserts the removed module 2215, 2315 into a corresponding memory module reader and forwards the recorded files to a transcription service via, for example, email. In still another instance, the wearer inserts the memory module into a reader coupled to the wearer's personal computer. Transcription software executed by the wearer's personal computer (e.g., transcription module including medical vocabulary, available from Computer Programs & Systems, Inc., Mobile, Ala., transcription module available from L&H Dragon Systems, Inc., Newton, Mass.) creates a text file of the recorded dictation.

Alternatively, the wearer's voice is transmitted to a remote location (e.g., remote transcription service, transcription-capable computer located elsewhere in the hospital). The received dictation is transcribed at the remote location into a text file. In some instances the text file, or a printout of the text file, is made available to the surgeon immediately after completing surgery. For example, the surgeon enters the surgeon's lounge, prints the transcribed surgical notes dictation, and edits the transcript. One or both removable memory units 2212, 2312 may be omitted from embodiments in which the wearer's voice is routed in real time to a remote transcription system.

In embodiments in which a transcription text file is created, either by a service or by the wearer's computer, the wearer then edits the text file transcription using a word processing program executed by the personal computer. The user then adds an electronic signature to the edited text file to signify approval (a legal requirement for surgical records in many jurisdictions) and forwards the approved file to a hospital record storage area. Alternatively, the wearer prints a copy of the transcribed text and edits the printed copy. Thus embodiments permit the entire required surgical dictation process to be completed without using paper and without using a human transcription service.

Communication devices configured to operate using the BLUETOOTH protocol periodically poll for other BLUETOOTH devices entering communication range. Under BLUETOOTH, device profiles are defined (e.g., identifying a device as a headset). Accordingly, if one BLUETOOTH device enters communication range of a second BLUETOOTH device, each BLUETOOTH device will receive information regarding the communication capability of the other. Thus in some instances, when the wearer enters communication range of a base station, a communication link between the eyeglasses and base station is automatically established. In other instances the communication link between the eyeglasses and base station is controlled to prevent interference when multiple base stations are in close proximity.

FIG. 24 is a diagrammatic plan view showing two illustrative operating theaters 2402a and 2402b. Base station 2404a is located in theater 2402a and is connected to telephone 2406a as described above. Likewise, base station 2404b is located in theater 2402b and is connected to telephone 2406b. Telephones 2406a, 2406b are illustrative of the various possible connections for the base stations.

A person 2408 wearing the two-way communication eyeglasses coupled to a wearer unit is within range of both base stations 2404a, 2404b when located in theater 2402a. Thus person 2408 registers his or her wearer unit with base station 2404a. Such registration is accomplished by, for example, establishing an electrical connection (using, e.g., conventional pogo prongs) between the BLUETOOTH circuits in the wearer unit and base station. In other embodiments registration is accomplished by sending a particular registration code between the BLUETOOTH circuits via a wireless signal. Registration includes the wearer unit and/or eyeglasses sending the unique identification code to the base station. Thus the base station is aware of the particular registered wearer unit's identity. Several wearers may register with a single base station. In some instances the number of wearers registered with a particular base station is limited by the number of simultaneous communication channels (one channel per wearer for voice and, where applicable, data) supported by that particular base station. In some cases, registration with base station 2404a ties the wearer(s) to the telephone number(s) associated with telephone 2406a.

In some instances the wearer's registration is automatically terminated if the wearer moves outside of the range of the registered base station. Under the BLUETOOTH standard, for example, communicating units are continuously polled to determine if they are within range. In other instances wearer unit 200 issues a command to the registered base station to terminate registration. For example, FIG. 24 shows wearer 2408 exiting theater 2402a and entering theater 2402b, yet remaining within range of base station 2404a. When wearer 2408 begins registration with base station 2404b and before registration with base station 2404b is complete, wearer unit 200 instructs base station 2404a (or all base stations with which wearer unit 200 is registered) to terminate registration. Alternatively, wearer 2408 terminates registration with base station 2404a prior to leaving theater 2402a by issuing and instruction (e.g., pressing a button on the base station user control).

Embodiments are not limited to use in the medical field. For example, FIG. 25 is a diagrammatic view illustrating eyewear 100 coupled via neck strap 1402 to a conventional communications device 2502 such as a cellular telephone or personal digital assistant (e.g., VISOR PDA manufactured by Handspring, Inc., Mountain View, Calif., which in some cases includes cellular telephone capability). Conventional baseband processing module 2504 (e.g., plug-in BLUETOOTH module) is coupled to communications device 2502. Signals 2506 carry audio and data between module 2004 and base station 2508 as described above. If device 2502 omits a DSP that is programmed to carry out a desired function as described above, that function is carried out by the DSP in base station 2508.

FIG. 25 also illustrates that eyeglasses 100 are used in some instances to facilitate hands-free operation of other devices. For example, communication between device 2502 (e.g., cellular telephone) and cellular antenna 2510 are via signals 2512. Antenna 2510 is coupled to mobile switching center 2514 which, in turn, is coupled to the public switched telephone system (PSTN) (not shown). Thus a single set of eyeglasses 100 is used for two or more different applications.

This disclosure describes specific illustrative embodiments, but various other embodiments exist. For example, skilled persons will understand that references to eyeglasses 100 embodiments apply equally to all eyeglasses embodiments, including 400 and 1502. As another example, the several described wearer units and base stations may be configured as described in any of the various system embodiments. Accordingly, the scope of the invention is limited only by the following claims.

We claim:

1. Eyewear comprising:
   an eye protection portion;
   an earstem coupled to the eye protection portion, wherein the earstem comprises a temple portion, an earpiece, and a speaker support loop continuously positioned between the temple portion and the earpiece; and
   a speaker supported by the support loop.

2. The eyewear of claim 1, wherein the speaker support loop comprises a continuous curve of the earstem.

3. The eyewear of claim 1, wherein the speaker support loop is positioned to hold the speaker such that an air gap exists between the speaker and the eyewear wearer's external outer ear.

4. The eyewear of claim 3 further comprising:
   a second earstem coupled to the eye protection portion, wherein the second earstem comprises a second temple portion, a second earpiece, and a second speaker support loop positioned between the second temple portion and the second earpiece; and
   a second speaker supported by the second support loop; wherein the second speaker support loop is positioned to hold the second speaker such that an air gap exists between the second speaker and the eyewear wearer's opposite external outer ear.

5. The eyewear of claim 1 further comprising a speaker mount positioned within the support loop, the speaker being mounted in the speaker mount.

6. The eyewear of claim 5 further comprising an axis of rotation of the speaker mount within the support loop, the speaker being mounted offset from the axis of rotation in the speaker mount.

7. The eyewear of claim 5, wherein the speaker mount comprises an oblong shape comprising a proximal end and a distal end, the speaker mount being mounted near the proximal end in the support loop, the speaker being mounted near the distal end.

8. The eyewear of claim 5, wherein the speaker mount is rotatably mounted in the support loop.

9. The eyewear of claim 5, wherein the speaker mount is slidably mounted in the support loop.

10. The eyewear of claim 1 further comprising a microphone housing and a microphone positioned within the microphone housing.

11. The eyewear of claim 10, wherein the microphone is a directional microphone and the microphone housing is configured to pick up the eyewear wearer's voice.

12. The eyewear of claim 11 comprising a second microphone mounted in a second microphone housing, wherein the second microphone is a directional microphone and the second microphone housing is configured to pick up the eyewear wearer's voice.

13. The eyewear of claim 10, wherein the microphone housing is positioned in the earstem.

14. The eyewear of claim 10, wherein the eye protection portion comprises a frame and the microphone housing is positioned in the frame.

15. The eyewear of claim 10, wherein the microphone is a directional microphone oriented to pick up the eyewear wearer's voice, and wherein the speaker is positioned in a pickup sensitivity null of the directional microphone.

16. The eyewear of claim 10, wherein the speaker is positioned in a pickup sensitivity null of the microphone.

17. The eyewear of claim 10, wherein the speaker is positioned to output an accoustical dipole defined along an axis, and wherein the microphone is positioned in a plane approximately perpendicular to the axis of the dipole, whereby sound that arrives at the microphone from one lobe of the accoustical dipole is approximately 180 degrees out of phase from sound that arrives at the microphone from the opposite lobe of the accoustical dipole.

18. The eyewear of claim 1, wherein the eye protection portion comprising a lens, and wherein the lens transmits a maximum 2 percent average light intensity in an ultraviolet spectrum and transmits a minimum of 95 percent of average light intensity in a range associated with brightness perception of an eye.

19. The eyewear of claim 1 further comprising a neck strap, the neck strap comprising an electrical conductor coupled to the speaker.

20. The eyewear of claim 19 further comprising a plug electrically coupling the neck strap and the earstem.

21. The eyewear of claim 19, wherein the neck strap comprises a first electrical conductor coupled to the speaker and a second conductor coupled to a microphone.

22. A method of fabricating eyewear, comprising the acts of:

providing an eye protection portion;

providing an earstem comprising a temple portion, an earpiece, and a speaker support loop positioned between the temple portion and the earpiece;

coupling the earstem to the eye protection portion; and using the speaker support loop to support a speaker.

23. The method of claim 22, wherein providing the speaker support loop comprises forming the loop as a continuous curve of the earstem.

24. The method of claim 22, wherein providing the speaker support loop comprises positioning the loop to support the speaker such than an air gap exists between the speaker and the eyewear wearer's external outer ear.

25. The method of claim 24 further comprising the acts of:

providing a second earstem comprising a temple portion, an earpiece, and a speaker support loop positioned between the temple portion and the earpiece;

coupling the second earstem to the eye protection portion; and supporting a second speaker in the second speaker support loop;

wherein providing the second earstem comprises forming the second loop to support the second speaker such that an air gap exists between the second speaker and the eyewear wearer's opposite external outer ear.

26. The method of claim 22 further comprising the acts of:

positioning a speaker mount in the support loop such that the speaker mount rotates within the support loop around an axis of rotation; and positioning the speaker in the speaker mount to be offset from the axis of rotation.

27. The method of claim 22 further comprising the act of positioning a speaker mount in the support loop such that the speaker mount translates within the support loop.

28. The method of claim 22 further comprising the act of mounting a microphone in the eyewear.

29. The method of claim 28 wherein the microphone is a directional microphone, and wherein mounting the microphone comprises orienting the microphone to selectively pick up the eyewear wearer's voice.

30. The method of claim 28 further comprising the act positioning the speaker in a pickup sensitivity null of the microphone.

31. The method of claim 22 further comprising the act of using a lens in the eye protection portion to transmit a maximum 2 percent average light intensity in an ultraviolet spectrum and transmit a minimum of 95 percent of average light intensity in a range associated with brightness perception of an eye.

32. The method of claim 22 further comprising the act of providing in a neck strap an electrical conductor to be coupled to the speaker.

33. A method of fabricating eyewear, comprising the acts of providing a frame, a speaker supported by the frame, and a microphone supported by the frame; wherein the speaker is positioned to output an accoustical dipole defined along an axis, and wherein the microphone is positioned in a plane approximately perpendicular to the axis of the dipole, whereby sound that arrives at the microphone from one lobe of the accoustical dipole is approximately 180 degrees out of phase from sound that arrives at the microphone from the opposite lobe of the accoustical dipole.

34. A method of providing eyewear for two-way communication, comprising the acts of:

positioning a speaker with the eyewear such that the speaker outputs a first lobe of an accoustical dipole towards an ear of a user wearing the eyewear; and positioning a microphone with the eyewear such that the microphone receives the voice of the user wearing the eyewear;

wherein sound that arrives at the microphone from the first lobe of the accoustical dipole is approximately 180 degrees out of phase from sound that arrives at the microphone from a second lobe of the accoustical dipole opposite the first lobe.

35. A method of providing eyewear for two-way communication, comprising the acts of:

positioning a microphone with the eyewear such that the microphone receives the voice of a user wearing the eyewear; and positioning a speaker with the eyewear such that sound from the speaker outputs sound towards an ear of the user wearing the eyewear;

wherein sound from the speaker arrives at a pickup sensitivity null of the microphone.

36. An eyewear earstem comprising:

a first end portion;

a second end portion opposite the first end portion;

a support loop continuously positioned between the first and second end portions; and a speaker supported by at least a portion of the support loop.

37. The earstem of claim 36, wherein the second end portion is shaped to rest on at least a portion of a wearer's external outer ear.

38. The earstem of claim 36, wherein the support loop is positioned to hold the speaker away from a wearer's external outer ear such that an air gap exists between at least a portion of the speaker and the external outer ear.

39. The earstem of claim 36 further comprising a microphone positioned in the first end portion.

* * * * *

UNITED STATES PATENT AND TRADEMARK OFFICE
CERTIFICATE OF CORRECTION

PATENT NO. : 6,729,726 B2
DATED : May 4, 2004
INVENTOR(S) : Miller et al.

It is certified that error appears in the above-identified patent and that said Letters Patent is hereby corrected as shown below:

Column 19,
Line 3, before "conductor coupled to a microphone.", insert -- electrical --.

Signed and Sealed this

Twenty-third Day of November, 2004

JON W. DUDAS
*Director of the United States Patent and Trademark Office*